(12) United States Patent
Burkhart-Day et al.

(10) Patent No.: US 11,918,946 B2
(45) Date of Patent: Mar. 5, 2024

(54) PORTABLE AIR FILTRATION SYSTEM

(71) Applicant: Re-U-Zip, LLC, Santa Monica, CA (US)

(72) Inventors: Eric Edgar Burkhart-Day, Santa Monica, CA (US); Navaratan Kanna Sunkara, Marina del Rey, CA (US); Sivaketan Ramu Sunkara, Marina del Rey, CA (US)

(73) Assignee: Re-U-Zip, LLC, Santa Monica, CA (US)

( * ) Notice: Subject to any disclaimer, the term of this patent is extended or adjusted under 35 U.S.C. 154(b) by 450 days.

(21) Appl. No.: 17/027,084

(22) Filed: Sep. 21, 2020

(65) Prior Publication Data
US 2021/0086120 A1    Mar. 25, 2021

Related U.S. Application Data

(60) Provisional application No. 62/902,431, filed on Sep. 19, 2019.

(51) Int. Cl.
*B01D 46/00* (2022.01)
*B01D 46/42* (2006.01)
*B01D 46/12* (2022.01)

(52) U.S. Cl.
CPC ......... *B01D 46/0005* (2013.01); *B01D 46/12* (2013.01); *B01D 46/4272* (2013.01); *B01D 2265/023* (2013.01); *B01D 2265/04* (2013.01); *B01D 2271/02* (2013.01)

(58) Field of Classification Search
CPC .... B01D 46/0005; B01D 46/10; B01D 46/12; B01D 46/4272; B01D 2271/02; B01D 2265/023; B01D 2265/04
See application file for complete search history.

(56) References Cited

U.S. PATENT DOCUMENTS

| | | | | |
|---|---|---|---|---|
| 3,905,787 A | * | 9/1975 | Roth ................. | B01D 46/10 55/518 |
| 5,689,969 A | * | 11/1997 | Conroy ............. | B01D 39/1676 62/262 |
| 5,827,340 A | * | 10/1998 | Fiske ................ | B01D 46/0005 55/483 |
| 6,221,120 B1 | * | 4/2001 | Bennington ........ | F24F 13/085 55/525 |
| 6,793,715 B1 | * | 9/2004 | Sandberg ........... | B01D 46/10 55/501 |
| 2002/0189215 A1 | * | 12/2002 | Goyetche ........... | B01D 46/62 55/473 |

(Continued)

*Primary Examiner* — Robert Clemente
(74) *Attorney, Agent, or Firm* — Inskeep IP Group, Inc.

(57) ABSTRACT

A portable air filtration system for efficiently installing an air filtration system to a barrier which may be easily removed or replaced. The portable air filtration system generally includes a filtration unit which is adapted to be secured to a barrier over an opening in the barrier. The filtration unit includes a first connector which may include a fastener or a magnetic element. A second connector is provided to secure the filtration unit to the barrier, with the second connector including a fastener or a magnetic element on its first side to engage with the first connector and an adhesive on its second side to engage with the barrier. The filtration unit may also include a removable one-way valve such as a flap and an optional secondary filter.

19 Claims, 22 Drawing Sheets

(56) References Cited

U.S. PATENT DOCUMENTS

| | | | |
|---|---|---|---|
| 2010/0050579 A1* | 3/2010 | Chen | B01D 50/20 |
| | | | 55/307 |
| 2011/0225939 A1* | 9/2011 | Loggins | F24F 13/085 |
| | | | 55/357 |
| 2017/0007951 A1* | 1/2017 | DeChristofaro | B01D 46/0005 |
| 2017/0128868 A1* | 5/2017 | Simmons | E06B 9/24 |
| 2017/0128869 A1* | 5/2017 | Simmons | F24F 13/082 |
| 2017/0128871 A1* | 5/2017 | Schumacher | B01D 46/0005 |
| 2018/0185970 A1* | 7/2018 | Simmons | B01D 46/10 |
| 2021/0275952 A1* | 9/2021 | Simmons | B01D 46/10 |

* cited by examiner

PORTABLE AIR FILTRATION SYSTEM

CROSS REFERENCE TO RELATED APPLICATIONS

I hereby claim benefit under Title 35, United States Code, Section 119(e) of U.S. provisional patent application Ser. No. 62/902,431 filed Sep. 19, 2019. The 62/902,431 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a portable air filtration system for efficiently installing an air filtration system to a barrier which may be easily removed or replaced.

Related Art

Any discussion of the related art throughout the specification should in no way be considered as an admission that such related art is widely known or forms part of common general knowledge in the field.

Air filtration has been recognized as important in a wide range of industries for many, many years. However, air filtration has taken on a new level of importance in the time of COVID-19. The removal of particulates from air is of particular importance in the construction industry, in which dust and other types of particles can lead to significant health risks for those who are exposed on a regular basis.

When constructing a structure or renovating the same, it is often desirable to form dust barriers which keep dust and other particulates from entering a certain, cordoned-off area. Typically, such dust barriers are temporarily put up during construction, remodeling, and renovation projects to provide dust and particulate control in various areas of the project.

Such dust barriers are often simply plastic sheets which are secured to surrounding structures so as to enclose a space. However, filtration is needed to maintain a dust-free area. Existing filtration units can be difficult to install or are integrated with the barrier in a manner that they are immovable or must be disposed after each barrier is taken down.

SUMMARY

An example embodiment is directed to a portable air filtration system. The portable air filtration system includes a filtration unit which is adapted to be secured to a barrier over an opening in the barrier. The filtration unit includes a first connector which may include a fastener or a magnetic element. A second connector is provided to secure the filtration unit to the barrier, with the second connector including a fastener or a magnetic element on its first side to engage with the first connector and an adhesive on its second side to engage with the barrier. The filtration unit may also include a removable one-way valve such as a flap and an optional secondary filter.

There has thus been outlined, rather broadly, some of the embodiments of the portable air filtration system in order that the detailed description thereof may be better understood, and in order that the present contribution to the art may be better appreciated. There are additional embodiments of the portable air filtration system that will be described hereinafter and that will form the subject matter of the claims appended hereto. In this respect, before explaining at least one embodiment of the portable air filtration system in detail, it is to be understood that the portable air filtration system is not limited in its application to the details of construction or to the arrangements of the components set forth in the following description or illustrated in the drawings. The portable air filtration system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
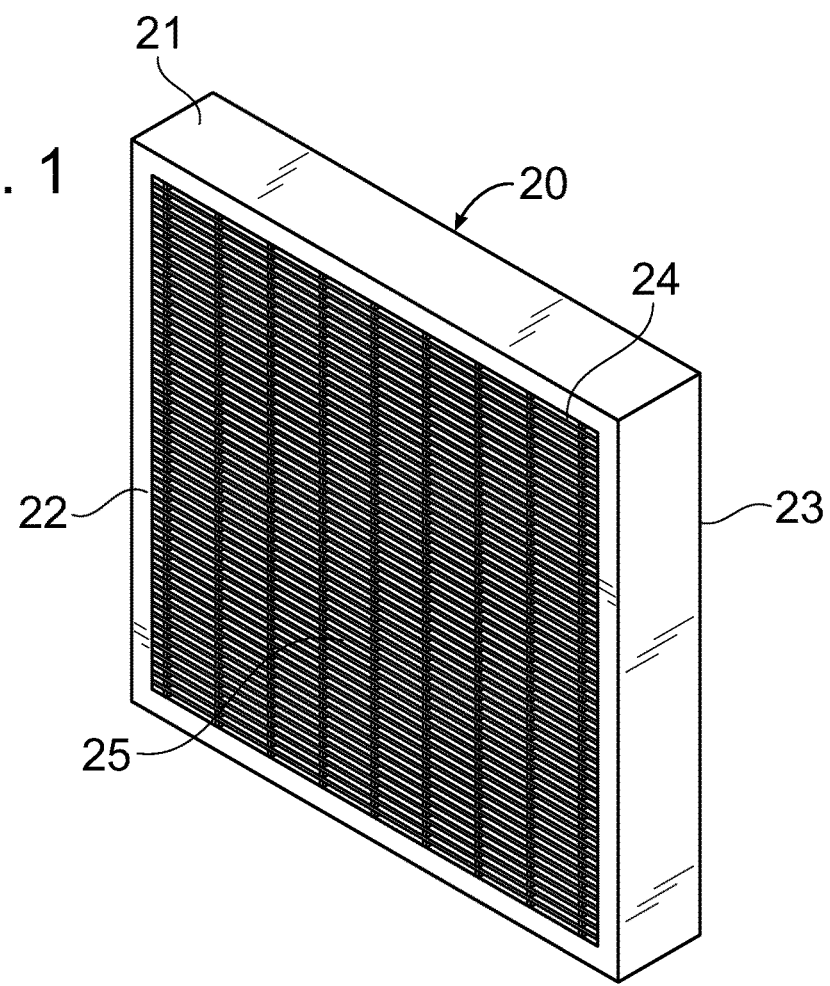
FIG. 1 is a front perspective view of a portable air filtration system in accordance with an example embodiment.
Figure 2:
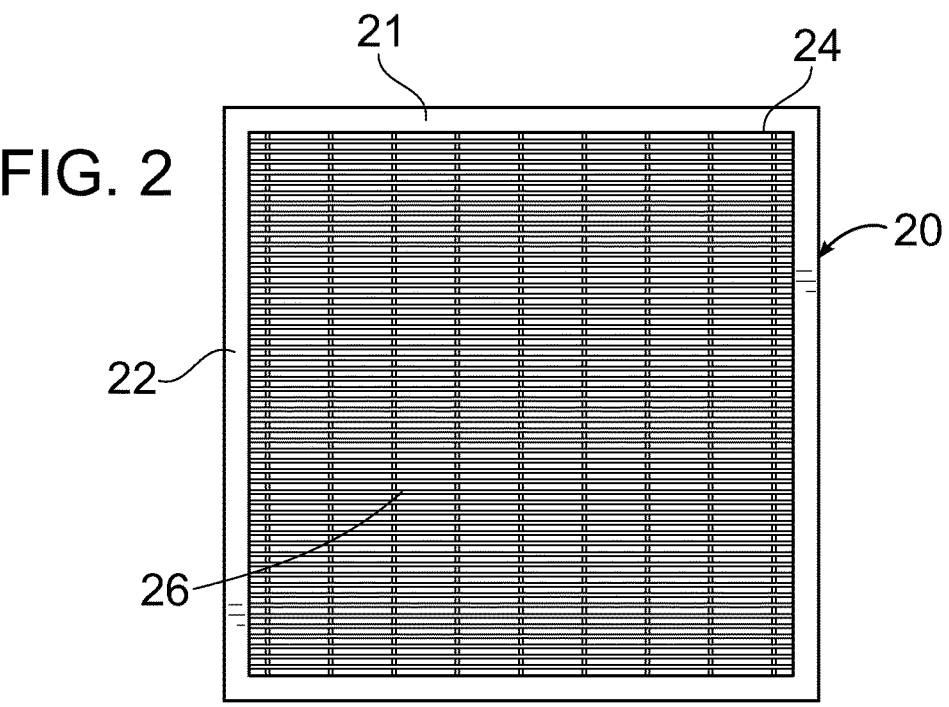
FIG. 2 is a front view of a portable air filtration system in accordance with an example embodiment.

A. Overview.

An example portable air filtration system 10 generally comprises a filtration unit 20 comprising a housing 21, a primary filter 26, and a first connector 30, wherein the housing 21 comprises a first end 22, a first opening 24 at the first end 22, a second end 23, and a second opening 25 at the second end 23, wherein the primary filter 26 is connected to the housing 21 such that an airflow entering the housing 21 passes through the primary filter 26; and a second connector 40 adapted to secure the filtration unit 20 against a barrier 12, the second connector 40 comprising a first side 41 and a second side 42, wherein the first side 41 of the second connector 40 is removably connected to the first connector 30, wherein the second side 42 of the second connector 40 is adapted to be removably connected to the barrier 12.

The first connector 30 may be connected to the second end 23 of the housing 21. The first connector 30 may be connected to the housing 21 so as to surround the second opening 25 of the housing 21. The first connector 30 may be comprised of a fastener 31. The first side 41 of the second connector 40 may also comprise a fastener 43, wherein the fastener 31 of the first connector 30 and the fastener 43 of the second connector 40 are each comprised of a hook-and-loop fastener. The second side 42 of the second connector 40 may be comprised of an adhesive 44 and the first side 41 of the second connector 40 may be comprised of a fastener 43.

The first connector 30 may be comprised of a first magnetic element 34, wherein the first side 41 of the second connector 40 is comprised of a second magnetic element 46, wherein the first magnetic element 34 is adapted to magnetically engage with the second magnetic element 46.

The filtration unit 20 may comprise a secondary filter 50, wherein the secondary filter 50 is removably connected to the first connector 30 of the filtration unit 20. The filtration unit 20 may comprise a gasket 28 positioned so as to surround the second opening 25 of the housing 21. The filtration unit 20 may comprise a one-way valve, wherein the one-way valve is comprised of a flap 48. The filtration unit 20 may comprise one or more retainers 32a, 32b, 32c, 32d, wherein the one-way valve is removably connected to the one or more retainers 32a, 32b, 32c, 32d.

Another embodiment of the portable air filtration system 10 may comprise a barrier 12 adapted to enclose a space, wherein the barrier 12 comprises an opening 15; a filtration unit 20 adapted to be connected to the barrier 12 so as to cover the opening 15 of the barrier 12, the filtration unit 20 comprising a housing 21, a primary filter 26, and a first connector 30, wherein the housing 21 comprises a first end 22, a first opening 24 at the first end 22, a second end 23, and a second opening 25 at the second end 23, wherein the primary filter 26 is connected to the housing 21 such that an airflow entering the housing 21 passes through the primary filter 26; a second connector 40 for connecting the filtration unit 20 to the barrier 12, the second connector 40 comprising a first side 41 and a second side 42, wherein the second side 42 of the second connector 40 is connected to the barrier 12, wherein the first side 41 of the second connector 40 is removably connected to the first connector 30.

B. Filtration Unit.

As best shown in FIGS. 1-4, the system 10 generally includes a filtration unit 20 which comprises a housing 21 and a primary filter 26. The primary filter 26 may be connected to the housing 21 such as by being positioned within the housing 21 such as shown in FIG. 1. In the embodiment shown in the figures, it can be seen that the housing 21 is secured around the primary filter 26. In some embodiments, the primary filter 26 may be removably connected to the housing 21 such that the primary filter 26 may be replaced as-needed. In some embodiments, the primary filter 26 may be integrated with the housing 21.

The shape, size, and configuration of the filtration unit 20, including the housing 21 and primary filter 26, may vary in different embodiments. In the exemplary embodiment best shown in FIG. 1, the filtration unit 20 is illustrated as comprising a first end 22 and a second end 23. In such an embodiment, the first end 22 is illustrated as comprising an inlet end of the filtration unit 20 through which airflow may enter the filter 26. The second end 23 is illustrated as comprising an outlet end of the filtration unit 20 through which airflow may exit the housing 20 after passing through the primary filter 26.

As shown in FIGS. 1-4, the filtration unit 20 includes a primary filter 26 which is connected to the housing 21. The primary filter 26 may be secured within the housing 21 (i.e., the housing 21 surrounds the primary filter 26) or may be secured to the outside of the housing 21 in alternate embodiments. In the exemplary embodiment shown in the figures, the housing 21 includes an internal cavity within which the primary filter 26 is secured. The primary filter 26 is preferably positioned so as to cover the entire first and second openings 24, 25 of the housing 21 such that all airflow passing through the filtration unit 20 will pass through the primary filter 26.

The type of primary filter 26 may vary in different embodiments. In a preferred embodiment as shown in the figures, the primary filter 26 may comprise a high-efficiency particulate absorbing (HEPA) material which meets HEPA standards for removing particulates from passing air. Thus, the primary filter 26 is preferably comprised of a material known to remove at least 99.95% of particles whose diameter is equal to 0.3 micrometers. Thus, the primary filter 26 is generally comprised of a mat of randomly arranged fibers, such as fiberglass. The primary filter 26 may also be comprised of various types of membrane filters.

The shape and dimensions of the primary filter 26 may vary in different embodiments. The figures illustrate an exemplary embodiment in which the primary filter 26 is comprised of a rectangular shape which is slightly larger than the size of the rectangular first and second openings 24, 25 of the filtration unit 20. In other embodiments, the primary filter 26 may comprise various other shapes, so long as the first and second openings 24, 25 are fully covered by the primary filter 26. The depth of the primary filter 26 may also vary in different embodiments, and should not be construed as limited by the exemplary figures. The primary filter 26 may thus have greater or lesser depth than the embodiment shown in the figures.

Figure 3:
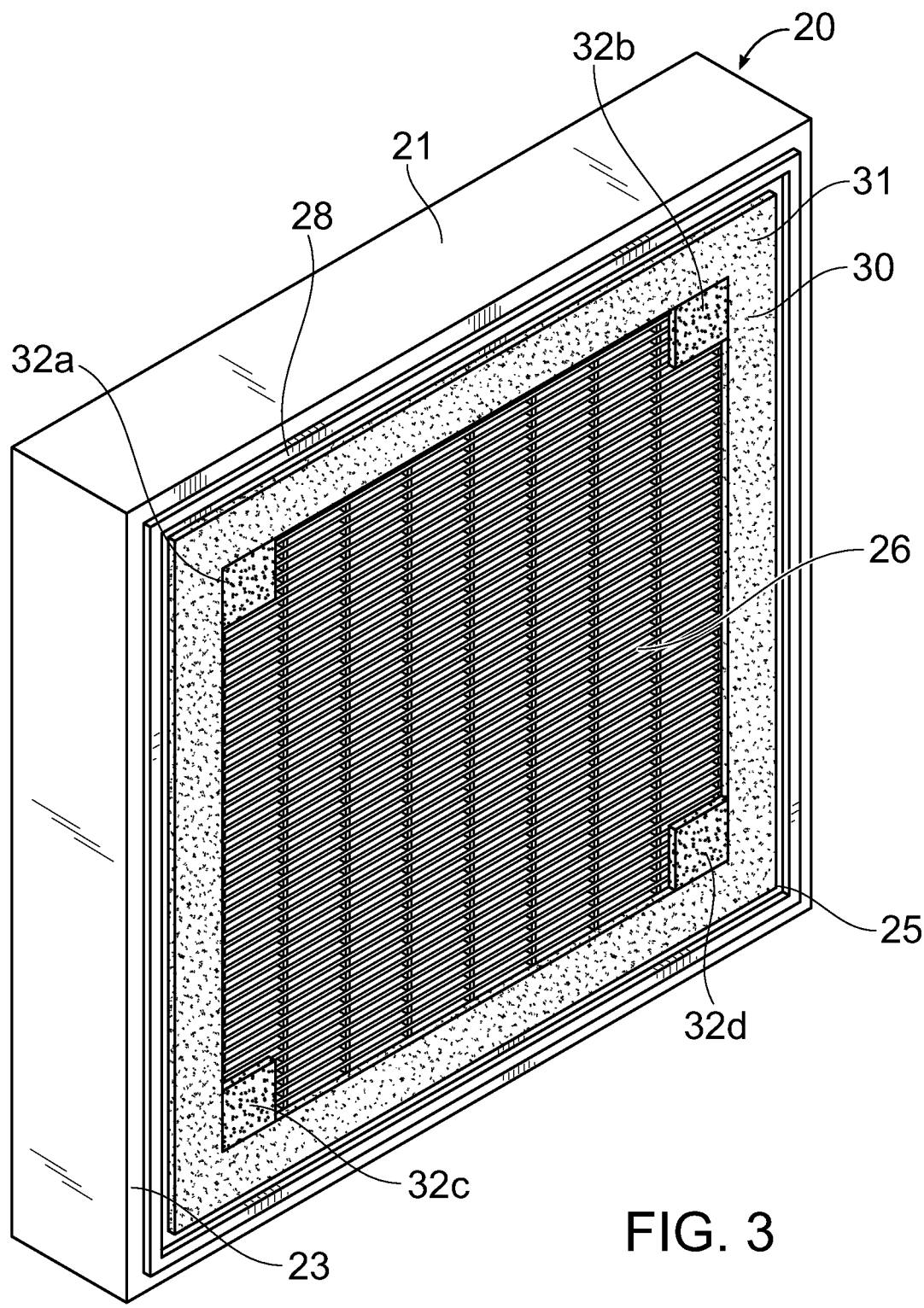
FIG. 3 is a rear perspective view of a portable air filtration system in accordance with an example embodiment.
Figure 4:
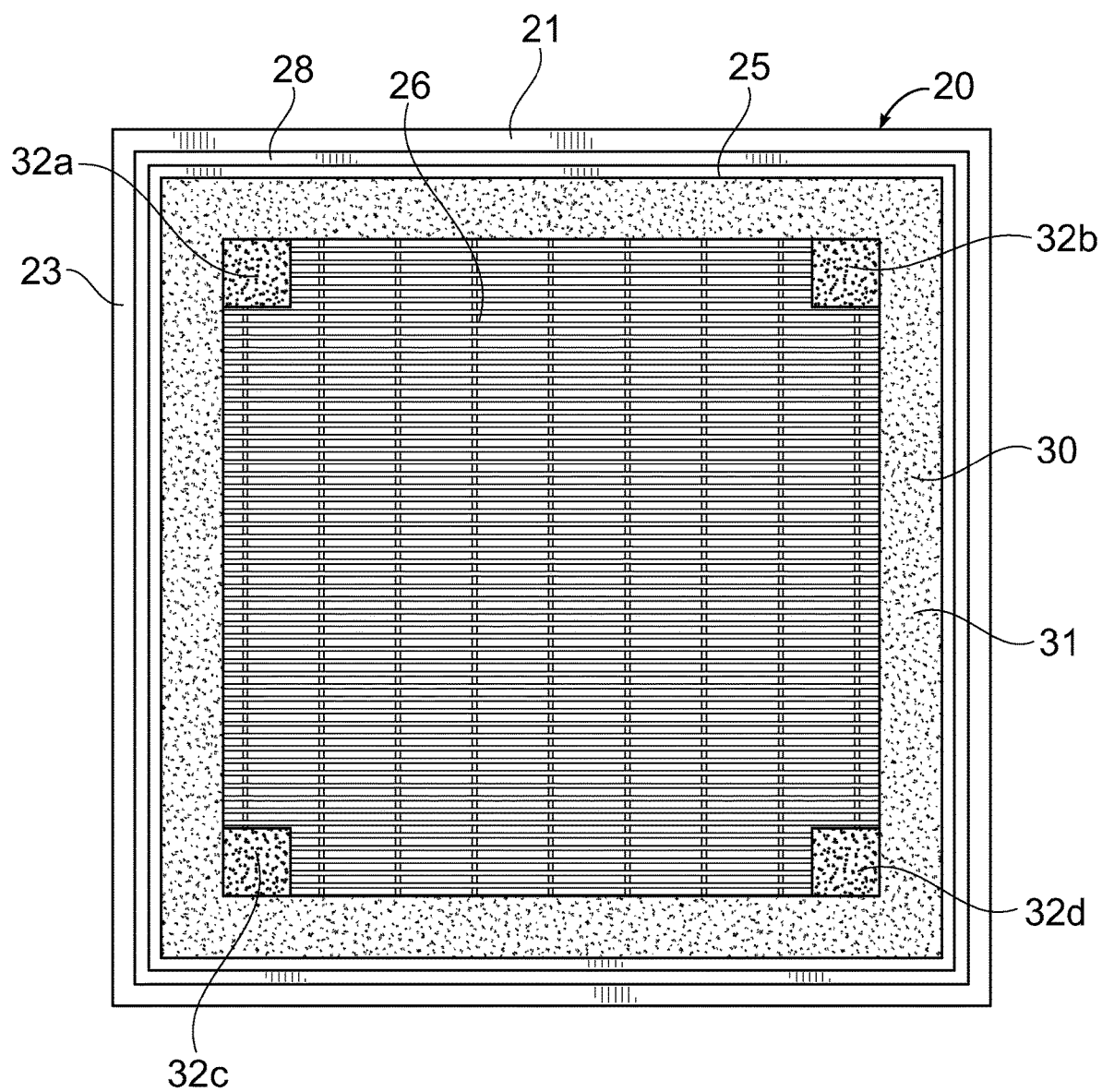
FIG. 4 is a rear view of a portable air filtration system in accordance with an example embodiment.

FIGS. 3 and 4 illustrate an exemplary embodiment in which the second end 23 of the filtration unit 20 includes a first connector 30, with the first connector 30 being secured to a barrier 12 such that the second end 23 of the filtration unit 20 is connected to the barrier 12 by the first connector 30. It should be appreciated that, in an alternate embodiment, the reverse arrangement may be utilized. In such an embodiment, the first end 22 of the filtration unit 20 may instead include the first connector 30 such that the first end 22 of the filtration unit 20 may be connected to the barrier 12 by the first connector 30.

FIGS. 1-4 illustrate a rectangular housing 21 which includes a first opening 24 at its first end 22 and a second opening 25 at its second end 23. It should be appreciated that the dimensions of the filtration unit 20 may vary in different embodiments to suit different applications. In some embodiments, the filtration unit 20 may be considerably larger than the exemplary embodiment shown in the figures.

Further, the shape of the filtration unit 20, including the shape of the housing 21, openings 24, 25, and primary filter 26, may vary in different embodiments. The figures illustrate an embodiment in which the housing 21, openings 24, 25, and primary filter 26 are each comprised of a rectangular-shape. One or more of the housing 21, openings 24, 25, and/or primary filter 26 may comprise different shapes in different embodiments, including circular, triangular, polygonal, and the like.

In the embodiment shown in the figures, the airflow enters the housing 21 through the first opening 24, passes through the filter 26, and then exits the housing 21 through the second opening 25. Thus, in the embodiment shown in the figures, the first end 21 of the filtration unit 20 may comprise an inlet end which receives airflow and the second end 23 of the filtration unit 20 may comprise an outlet end expels airflow. It should be appreciated that such an embodiment is merely for exemplary purposes, as in other embodiments the first end 22 of the filtration unit 20 may be the outlet end and the second end 23 of the filtration unit 20 may be the inlet end.

FIGS. 3 and 4 illustrate an exemplary embodiment of the second end 23 of the filtration unit 20 which includes a first connector 30 that is adapted to be connected to a barrier 12 by engaging with a second connector 40 that is itself connected to the barrier 12. The housing 21 is shown as comprising a second opening 25 through which the primary filter 26 can be seen. Airflow exits through the second opening 25, which may be secured against a barrier 12 by the first and second connectors 30, 40 as discussed herein.

Continuing to reference FIGS. 3 and 4, it can be seen that the filtration unit 20 may comprise a gasket 28. The gasket 28 is utilized to ensure a more perfect seal between the second end 23 of the filtration unit 20 and the barrier 12 when the filtration unit 20 is secured against the barrier 12 by the first and second connectors 30, 40.

In the exemplary embodiment shown in the figures, the gasket 28 is illustrated as comprising an elongated member comprised of a gasket material such as rubber or plastic that surrounds the second opening 25 of the housing 21. Preferably, the gasket 28 will completely surround the second opening 25 of the housing 21 such that there are no gaps in the seal between the filtration unit 20 and the barrier 12 when the filtration unit 20 is installed. Thus, the gasket 28 may comprise a closed-loop which runs along the outer perimeter of the second end 23 of the housing 21 as shown in the figures.

With continued reference to FIGS. 3 and 4, it can be seen that the second end 23 of the filtration unit 20 may comprise a first connector 30 which is utilized to removably secure the filtration unit 20 to a second connector 40, with the second connector 40 being itself secured to the barrier 12. In this manner, the filtration unit 20 may be secured to the barrier 12 as discussed in more detail below.

The first connector 30 is generally comprised of an elongated member which is fixedly or removably connected to the second end 23 of the filtration unit 20. However, in certain embodiments, the first connector 30 may instead be fixedly or removably connected to the first end 22 of the filtration unit 20. In either case, the first connector 30 is utilized to secure the first end 22 or the second end 23 of the filtration unit 20 to the barrier 12 by engaging with a corresponding second connector 40 that is removably connected to the barrier 12.

The figures illustrate that the first connector 30 is oriented to surround the second opening 25 of the housing 21 of the filtration unit 20, with the first connector 30 comprising a closed-loop configuration. In alternate embodiments, the first connector 30 may not be comprised of a closed-loop, but may instead comprise one or more discrete sections of a connector material. For example, the first connector 30 could comprise a first strip of material along a first edge of the second opening 25 and a discrete second strip of material along a second edge of the second opening 25.

In the exemplary embodiment shown in FIGS. 3 and 4, the first connector 30 may comprise an elongated strip of material which is positioned around the second opening 25 of the housing 21, concentric and inside of the gasket 28. Preferably, the gasket 28 will be positioned outside of the first connector 30 as shown in the figures so as to perfect the seal between the filtration unit 20 and the barrier 12. Thus, the first connector 30 may be inwardly-offset with respect to the gasket 28 and outwardly-offset with respect to the second opening 25 of the housing 21 (e.g., the first connector 30 is positioned between the second opening 25 and the gasket 28).

The first connector 30 will generally comprise a fastener 31 such as shown in FIGS. 3 and 4. An exemplary type of fastener 31 may comprise a hook-and-loop fastener such as Velcro. In any embodiment, the first connector 30 will generally comprise a fastener 31 which is adapted to engage with a corresponding fastener 43 of the second connector 40. The use of a hook-and-loop fastener 31 allows for the first and second connectors 30, 40 to be easily and securely engaged with each other while still allowing the first and second connectors 30, 40 to be easily disengaged as-needed to remove the filtration unit 20 from the barrier 12.

FIGS. 16-19 illustrate an alternate embodiment in which the first connector 30 is comprised of a first magnetic element 34. In such an embodiment, the first connector 30 may comprise an elongated strip of magnetic material which is adapted to magnetically engage with a corresponding second magnetic element 46 on the second connector 40. Such a configuration negates the need for hook-and-loop fastener 31, with the magnetic element 34 replacing the hook-and-loop fastener 31 in such an embodiment.

Continuing to reference FIGS. 3 and 4, it can be seen that the filtration unit 20 may comprise one or more retainers 32a, 32b, 32c, 32d adapted to removably secure a secondary filter 50 over the second opening 25 of the housing 21 of the filtration unit 20. As shown, the retainers 32a, 32b, 32c, 32d may each comprise a square-shaped tab which extends into the circumference or outer perimeter of the second opening 25, such as at the corners of the second opening 25 as shown in FIG. 4.

The retainers 32a, 32b, 32c, 32d may comprises fasteners such as hook-and-loop fasteners which are adapted to removably engage with the secondary filter 50, which may itself have hook-and-loop fasteners, or may be comprised of a material known to removably engage (i.e., catch on to) a hook-and-loop fastener. In other embodiments, the retainers 32a, 32b, 32c, 32d may instead comprise rigid or semi-rigid tabs under which the corners of the secondary filter 50 may be secured. In other embodiments, the retainers 32a, 32b, 32c, 32d may comprise clips, buttons, clasps, brackets, or other structures known to temporarily secure a sheet of material (the secondary filter 50) in position to cover the second opening 25 of the housing 21 of the filtration unit 20.

Figure 13:
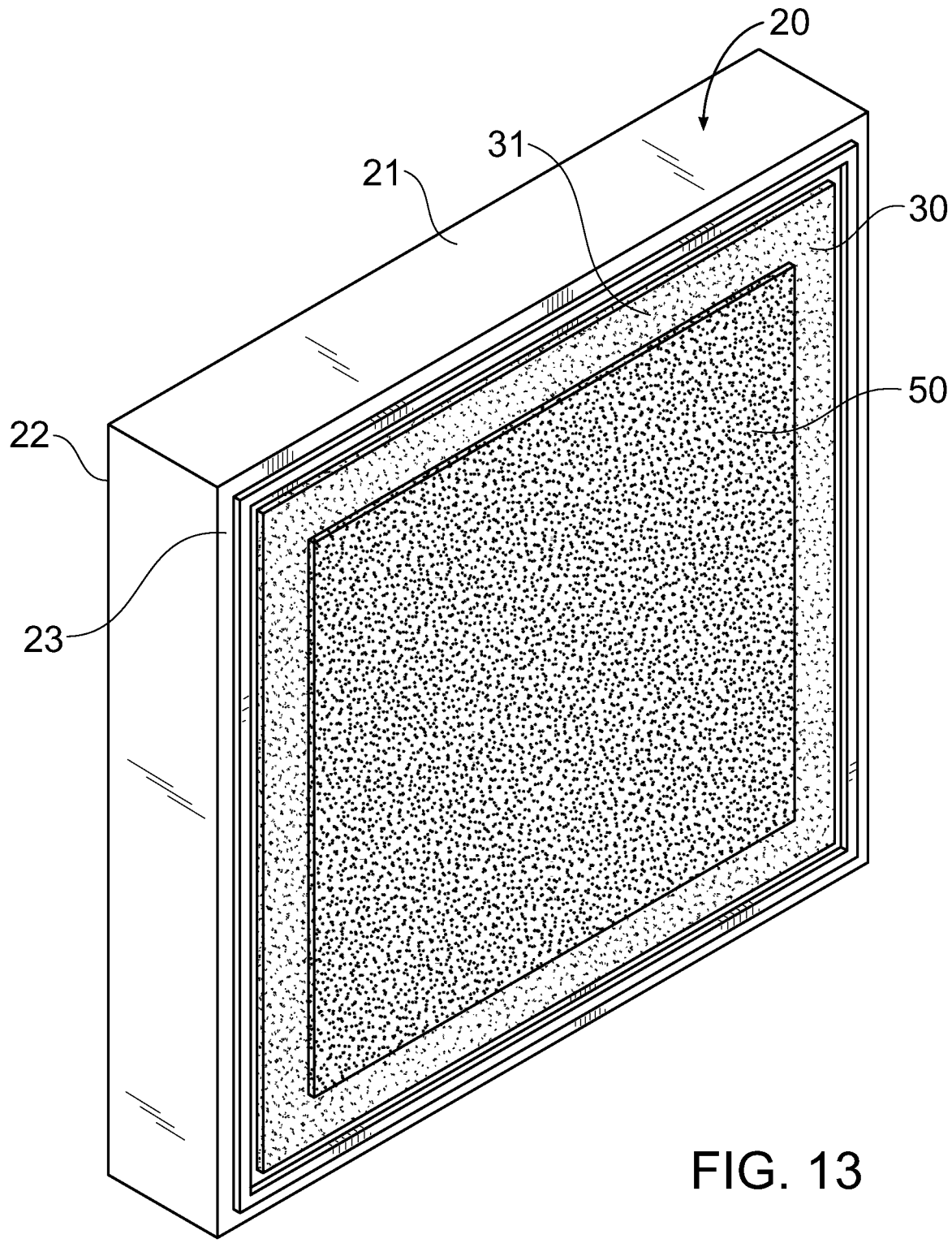
FIG. 13 is a perspective view of a filtration unit including a secondary filter of a portable air filtration system in accordance with an example embodiment.

It should be appreciated that the secondary filter 50 is an optional feature and may not be included in all embodiments of the portable air filtration system 10 described herein. FIG. 13 illustrates an exemplary embodiment which utilizes a secondary filter 50 to selectively and removably cover the second opening 25 of the housing 21 of the filtration unit 20. The secondary filter 50 may comprise various materials known to act as a filtering material, such as various porous materials including cloths and the like. The secondary filter 50 may comprise a sheet of such material as best shown in FIG. 13. In some embodiments, the secondary filter 50 may comprise a carbon filter.

In the exemplary embodiment shown in FIG. 13, it can be seen that four retainers 32a, 32b, 32c, 32d are provided. A first retainer 32a is positioned at a first corner of the second opening 25, a second retainer 32b is positioned at a second corner of the second opening 25, a third retainer 32c is positioned at a third corner of the second opening 25, and a fourth retainer 32d is positioned at a fourth corner of the second opening 25. More or less retainers 32a, 32b, 32c, 32d may be utilized in different embodiments. In some embodiments, the secondary filter 50 may be connected to the filtration unit 20 by various other means, such as by use of fasteners such as nails, clips, brackets, stapes, tape, adhesives, and the like.

More or less retainers 32a, 32b, 32c, 32d may be utilized in different embodiments so long as the secondary filter 50 may be securely connected to cover the second opening 25, with airflow passing through the secondary filter 50 after existing the primary filter 26. In some embodiments, the secondary filter 50 may be integrated with the housing 21 and not be removably connected. In a preferred embodiment, however, the secondary filter 50 will be removably connected to the filtration unit 20 by the retainers 32a, 32b, 32c, 32d as shown in the exemplary figures, which allows the secondary filter 50 to be easily replaced as-needed.

Figure 14:
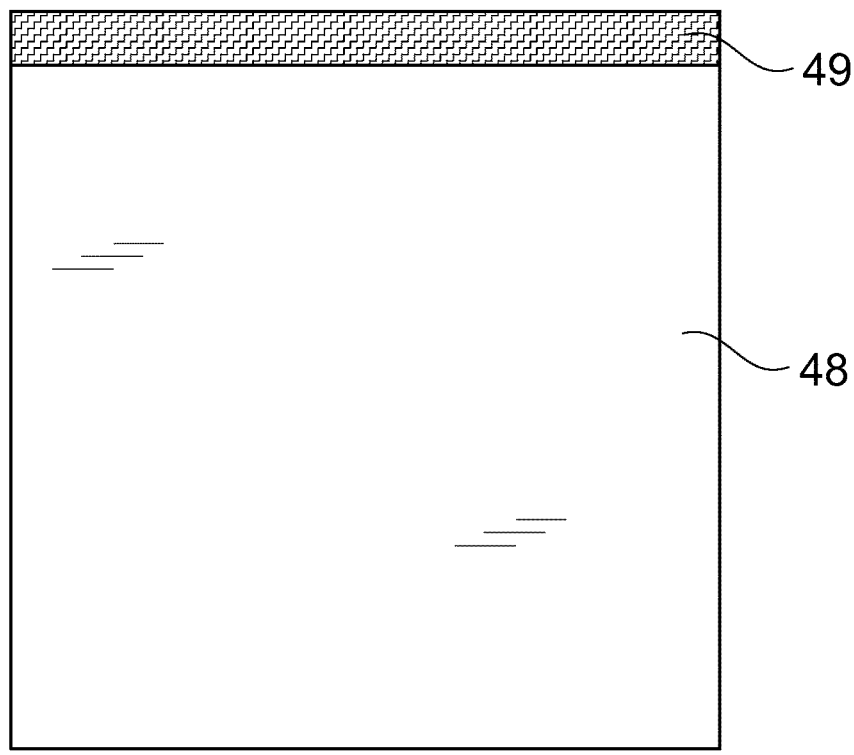
FIG. 14 is an end view of a one-way valve flap of a portable air filtration system in accordance with an example embodiment.
Figure 15:
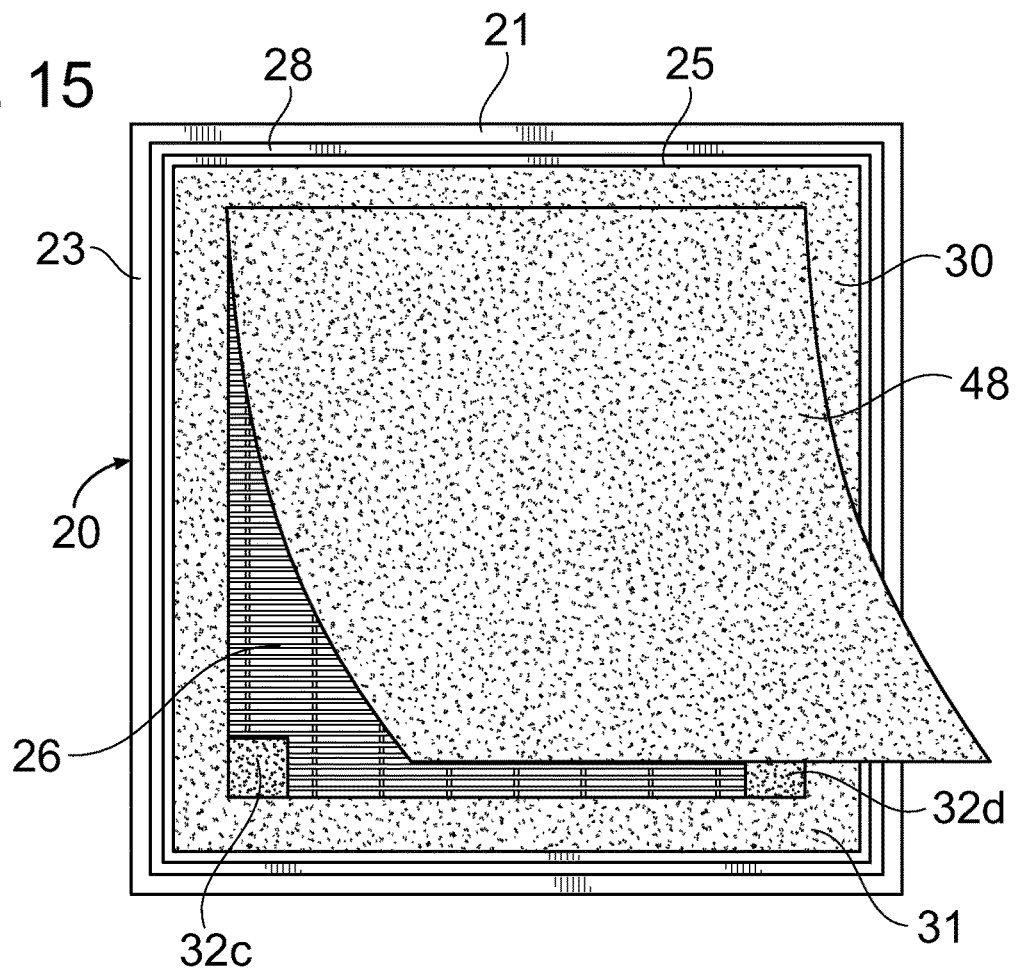
FIG. 15 is an end view of a filtration unit having a connected one-way valve flap of a portable air filtration system in accordance with an example embodiment.

As shown in FIGS. 14 and 15, the filtration unit 20 may comprise a flap 48 which functions as a one-way valve. The flap 48 may comprise an air-impermeable material such as plastic or the like which is secured to the filtration unit 20 by only one edge such that the other edges are freely-movable. In this manner, airflow passing in a first direction (inlet to outlet) will simply push the flap 48 outwardly such that the airflow may pass unimpeded. Airflow passing in a second direction (outlet to inlet) will function to press the flap 48 against the second opening 25 such that the airflow is impeded in the second direction. In this manner, it can be ensured that airflow only enters the barrier 12, and does not exit the barrier 12 (a negative pressure arrangement).

As shown in FIG. 14, the flap 48 may comprise a sheet of material which preferably does not allow air to freely pass therethrough. The manner in which the flap 48 is secured to the filtration unit 20 may vary in different embodiments. In the exemplary embodiment shown in FIG. 14, the flap 48 includes a strip of fastener 49 material such as a hook-and-loop fastener. As shown in FIG. 15, the strip of fastener 49 will removably engage with a portion of the first connector 30 to secure the flap 48 over the second opening 25 of the filtration unit 20.

In the exemplary embodiment shown in FIG. 15, only the upper edge of the flap 48 includes the fastener 49 material such that only the upper edge of the flap 48 is secured against the filtration unit 20, with the remaining edges being free to be pushed out by airflow in a first direction and pushed in by airflow in a second direction. It should be appreciated that the fastener 49 material need not necessarily be positioned along the upper edge of the flap 48 in all embodiments, as other edges such as the side edges or lower edge may instead include the fastener 49 material in certain embodiments, so long as the flap 48 is free to open for airflow in a first direction and close for airflow in a second direction to function as a one-way valve and thus maintain negative pressure within the barrier 12 to which the filtration unit 20 is secured.

It should be appreciated that the flap 48, and the retainers 32a, 32b, 32c, 32d by which the flap 48 is secured to the filtration unit 20, are optional and may not be included in all embodiments of the portable air filtration system 10. In some embodiments, the flap 48 may not be needed, such as where the maintenance of negative pressure within the barrier 12 is not critical. In other embodiments, a one-way valve may instead be formed by cutting the barrier 12 in a certain manner so as to leave a flap of barrier 12 material that is connected to the barrier 12 sheet by only one edge as discussed in more detail below.

C. Second Connector.

Figure 5A:
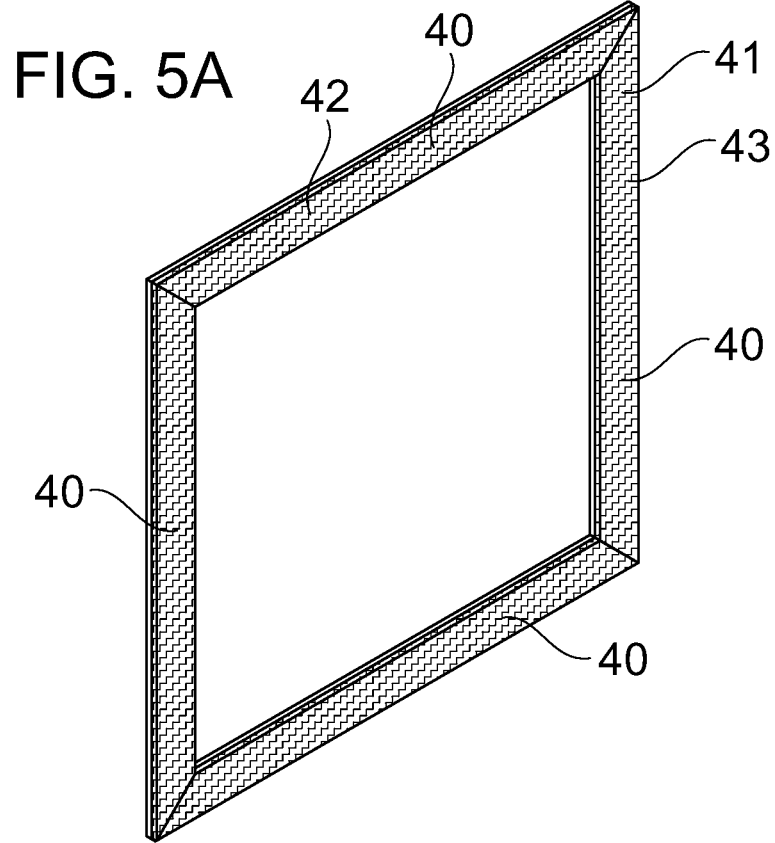
FIG. 5A is a perspective view of a second connector of a portable air filtration system in accordance with an example embodiment.
Figure 5B:
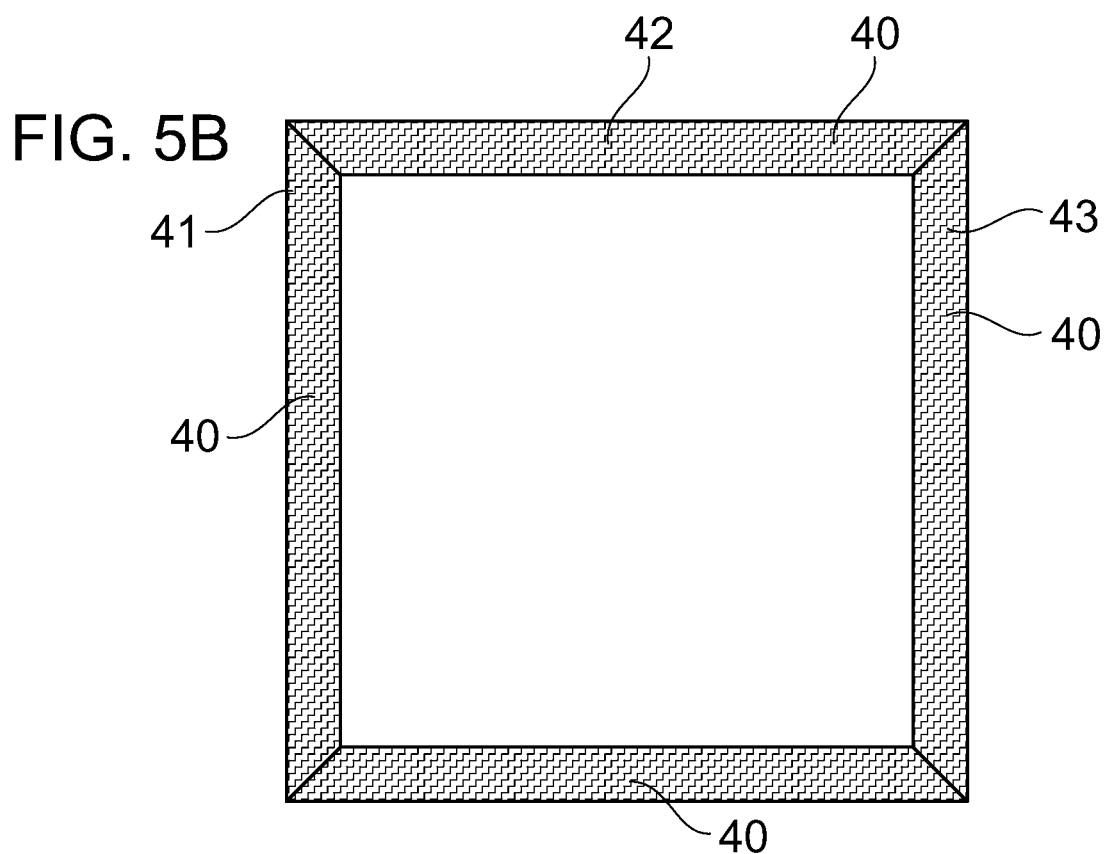
FIG. 5B is an end view of a second connector of a portable air filtration system in accordance with an example embodiment.
Figure 5C:
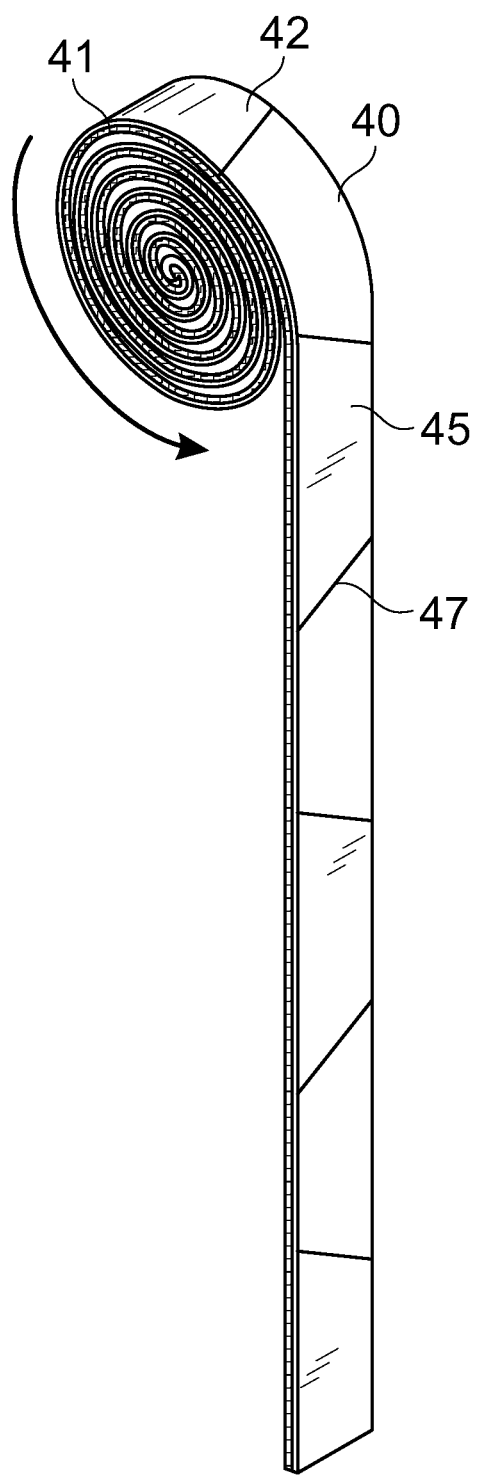
FIG. 5C is a perspective view of a rolled-up second connector of a portable air filtration system in accordance with an example embodiment.

As best shown in FIGS. 5A, 5B, 5C, 6A, and 6B, the portable air filtration system 10 may include a second connector 40 which is utilized to secure the filtration unit 20 against the barrier 12. The second connector 40 is generally comprised of an elongated strip of material as shown in FIGS. 5A, 5B, and 5C. The second connector 40 may be provided as a rolled-up strip of material such as shown in FIG. 5C, with the operator cutting the second connector 40 to size before securing to the barrier 12. In other embodiments, the second connector 40 may be provided in a shape which does not require any cutting by the operator, such as by providing the second connector 40 in a square frame shape as shown in FIGS. 5A and 5B without requiring the operator to make any cuts.

As shown in the figures, the second connector 40 may comprise a first side 41 and a second side 42, wherein the first side 41 is opposite with respect to the second side 42. The first side 41 may comprise an inner side of the second connector 40 which is adapted to removably engage with the first connector 30 of the filtration unit 20. The second side 42 may comprise an outer side of the second connector 40 which is adapted to engage with the barrier 12. In this manner, the second connector 40 may be utilized to secure the filtration unit 20 to the barrier 12, with the first side 41 of the second connector 40 engaging with the first connector 30 of the filtration unit 40 and the second side 42 of the second connector 40 engaging with the barrier 12.

FIGS. 5A and 5B best show the first side 41 of the second connector 40 which is adapted to engage with the first connector 30 of the filtration unit 20. The first side 41 of the second connector 40 may comprise a fastener 43 which is configured so as to removably engage with the fastener 31 of the first connector 30. In a preferred embodiment, the fastener 43 of the first side 412 of the second connector 40 may comprise a hook-and-loop fastener material such as Velcro. In other embodiments, other types of fasteners 43 may be utilized so long as the fastener 43 is operable to removably engage with the corresponding fastener 31 of the first connector 30.

Figure 6A:
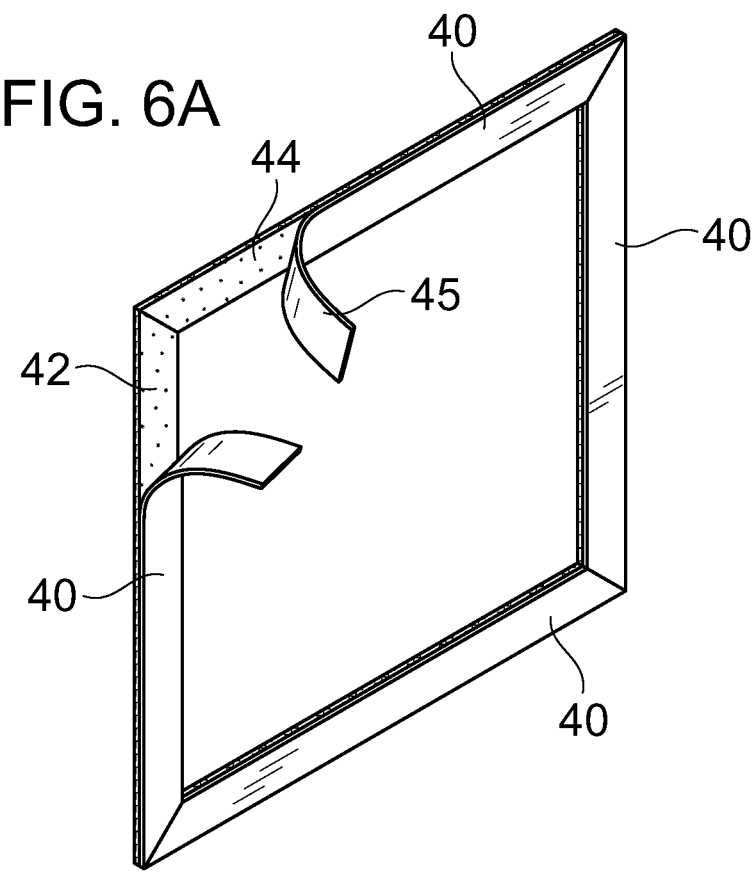
FIG. 6A is a perspective view of a second connector of a portable air filtration system in accordance with an example embodiment.

FIGS. 5C, 6A, and 5B best show the second side 42 of the second connector 40 which is adapted to engage with the barrier 12. The second side 42 of the second connector 40 may comprise an adhesive 44 such as glue or the like which is configured so as to removably engage the second side 42 of the second connector 40 with the barrier 12. Thus, the adhesive 44 may be comprised of a material which is particularly suited for adhering to plastic sheets which such barriers 12 are typically comprised of. However, different types of adhesive 44 suited for different types of materials may be utilized in connection with barriers 12 which are comprised of different materials than plastics which are commonly used.

To prevent the adhesive 44 from becoming used-up prematurely, a removable cover 45 may be secured to the second side 42 of the second connector 40 temporarily until such time as the second connector 40 is secured to the barrier 12. FIGS. 5C and 6A illustrate an exemplary embodiment of a removable cover 45, which may comprise various materials such as papers or plastics, with the side facing the adhesive being laminated or otherwise configured so as to not compromise the adhesive 44.

The cover 45 will generally comprise a strip of plastic material which may be transparent and is easily removed from the adhesive 44 when needed. The cover 45 also allows the second connector 40 to be rolled up as shown in FIG. 5C without the adhesive 44 sticking any parts of the second connector 40 together. Thus, the second connector 40 may be unrolled at the appropriate time, and an appropriate length of the cover 45 may be removed so as to expose the underlying adhesive 44.

As shown in FIG. 5C, the second connector 40 may initially be provided as a rolled-up strip of material, the material having fastener 43 on its first side 41 and adhesive 44 covered by the cover 45 on its second side 42. Either the first side 41 or the second side 42 of the second connector 40 may include indicia 47 which are utilized to cut the second connector 40 for use with the portable air filtration system 10. The figures illustrate that the indicia 47 is printed on the cover 45 on the second side 42 of the second connector 40. In other embodiments, the indicia 47 may instead be printed on the first side 41 of the second connector 40, or may be printed on both sides of the second connector 40.

The indicia 47 may be printed, such as by use of ink or the like which leaves a marking on the first side 41 and/or the second side 42 of the second connector 40. In other embodiments, the indicia 47 may instead be comprised of shallow grooves or ribs. The indicia 47 may be printed on the cover 45 or on the fastener 43 of the second connector 40. In some embodiments, the second connector 40 may be partially pre-cut.

In the exemplary embodiment best shown in FIG. 5C, each of the indicia 47 extends diagonally across the face of the second connector 40. Such a configuration is preferable to form square-shaped closed-loops of the second connector 40 with adjoining diagonal corners such as is shown in FIGS. 5A and 5B. However, in some embodiments, the indicia 47 may instead extend in a straight horizontal line. It should also be appreciated that the spacing and number of indicia 47 may vary in different embodiments, and thus should not be construed as limited by the exemplary embodiment shown in FIG. 5C. The figures illustrate that the indicia 47 alternate directions, but in some embodiments the indicia 47 may all extend in the same direction and at the same orientation.

As shown in FIGS. 5A-5C, the second connector 40 may comprise an elongated strip of material which is adapted to be cut by the operator and oriented as desired to match the overall shape of the first connector 30 of the filtration unit 20. In alternate embodiments, the second connector 40 may be provided already in the desired shape and orientation for use without any cutting being required. In such embodiments, the second connector 40 may be provided as a square-shaped frame such as shown in FIGS. 5A and 5B, with the cover 45 in place to be removed by the operator when needed.

The use of a rolled-up, elongated strip of material for the second connector 40 is preferable as it allows a wide range of versatility for the operation of the portable air filtration system 10 in determining how much of the second connector 40 to use for securing the filtration unit 20 to the barrier 12. If desired, more or less of the second connector 40 may be utilized. For example, if the operator determines that only two sides of the first connector 30 need be secured, only two strips of second connector 40 may be cut.

Figure 6B:
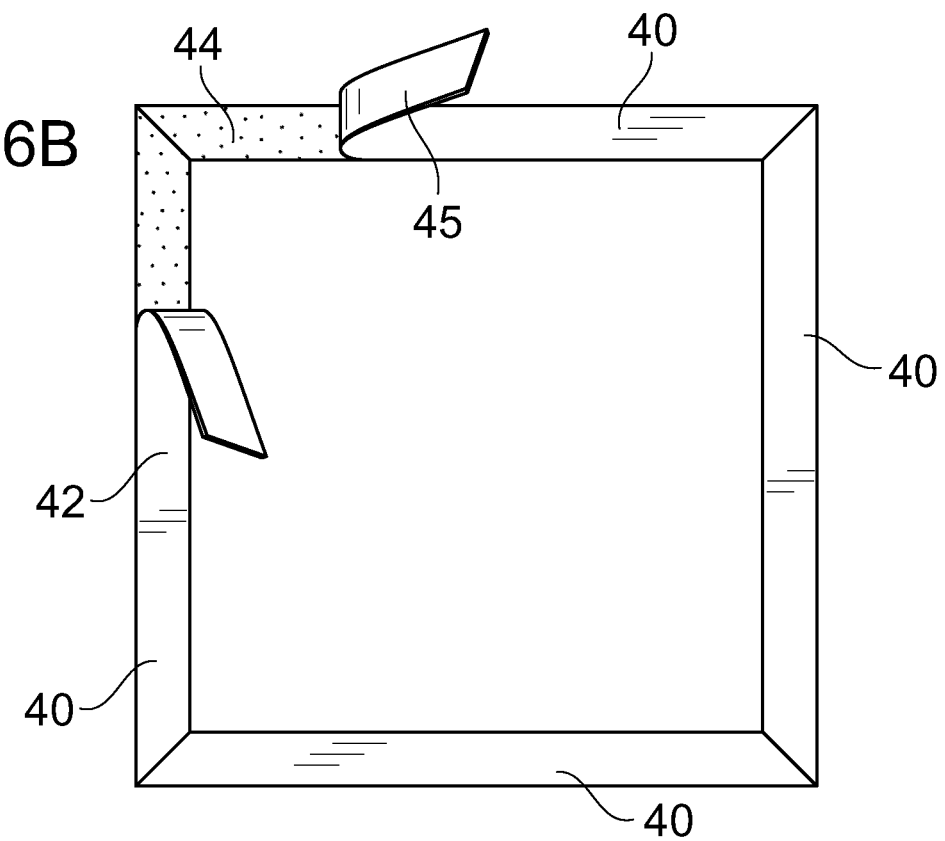
FIG. 6B is an end view of a second connector of a portable air filtration system in accordance with an example embodiment.
Figure 6C:
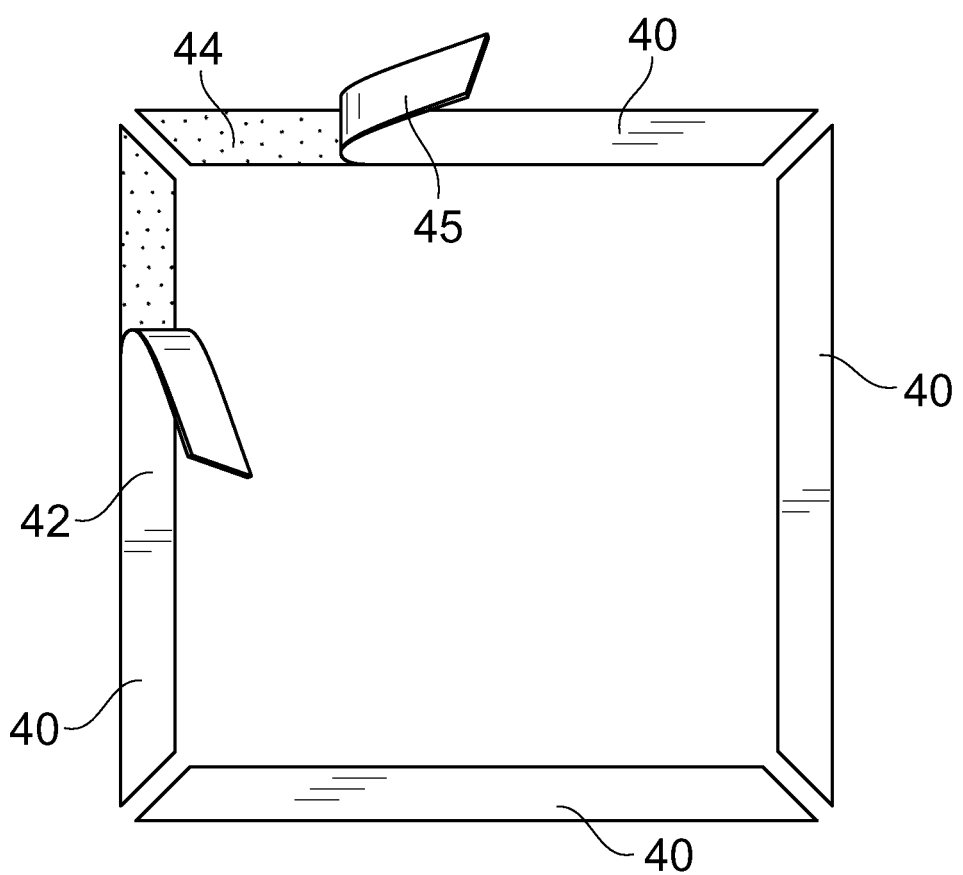
FIG. 6C is an end view of a second connector comprising multiple segments of a portable air filtration system in accordance with an example embodiment.

In some embodiments, the second connector 40 may come pre-cut and pre-assembled in the necessary shape for connection to the first connector 30. Such an embodiment is shown in FIGS. 6A and 6B, in which it can be seen that the second connector 40 may be provided in a pre-cut, frame configuration having a rectangular shape matching that of the first connector 30 shown in the previous figures. In other embodiments, such as shown in FIG. 6C, the second connector 40 may be provided as discrete segments of strips which may be individually connected to the first connector 30 or the barrier 12, or adjoined to form the frame-like shape.

Figure 7:
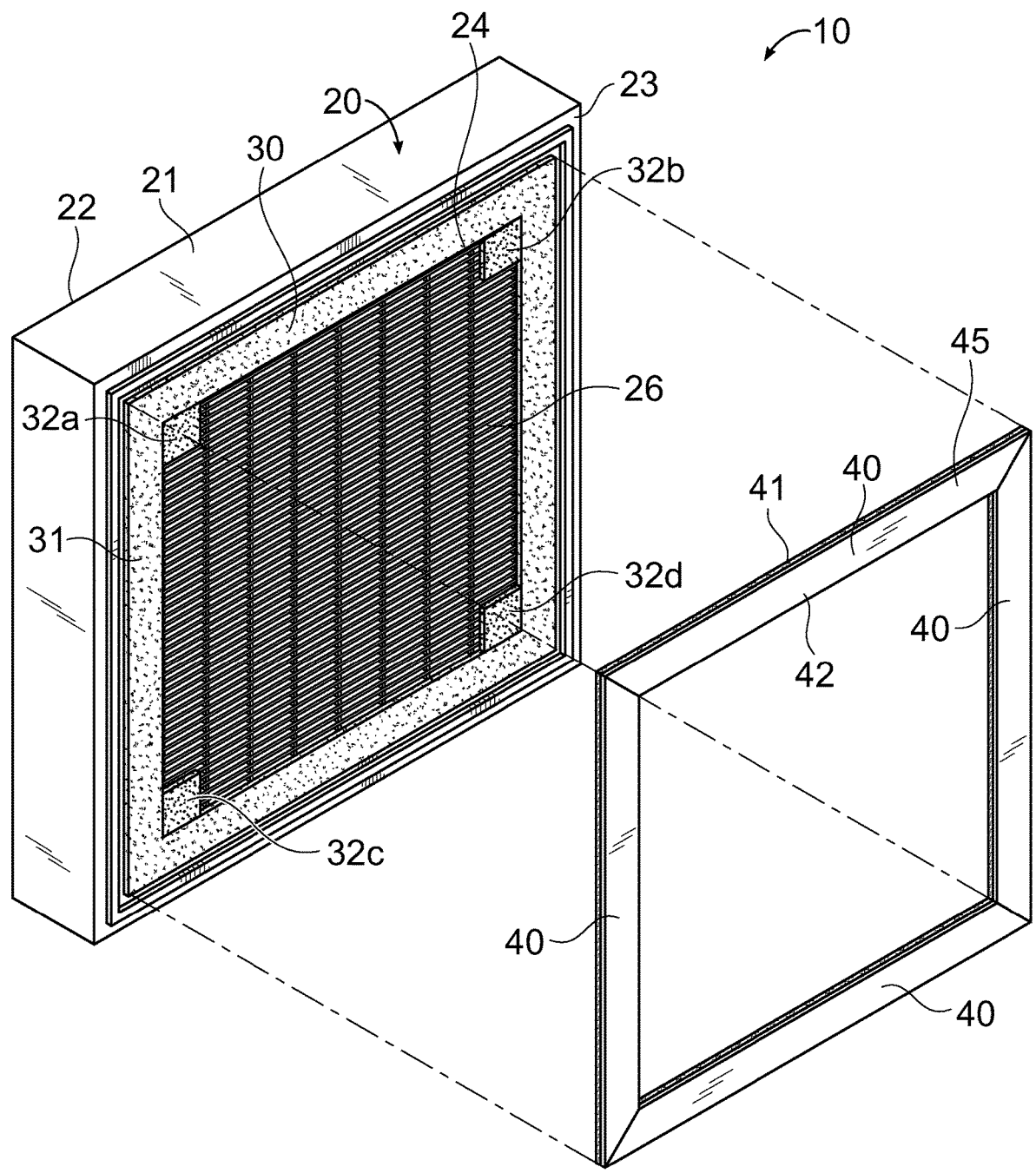
FIG. 7 is a perspective view of a second connector aligned to be connected to a first connector of a filtration unit of a portable air filtration system in accordance with an example embodiment.

FIG. 7 illustrates an exemplary embodiment in which a second connector 40 is shown aligned with a corresponding first connector 30 on the second end 23 of the filtration unit 20. As can be seen, the second connector 40 has either been provided in a rectangular or square shape for use, or the second connector 40 has been cut along indicia 47 into four strips which are then adjoined together to form the rectangular or square shape.

In either case, the second connector 40 is shown as matching the shape, size, and dimensions of the first connector 30. Such a configuration ensures a secure and airtight seal between the filtration unit 20 and the barrier 12, particularly when used in connection with a gasket 28 which surrounds both the first and second connectors 30, 40 when they are connected together.

Figure 8:
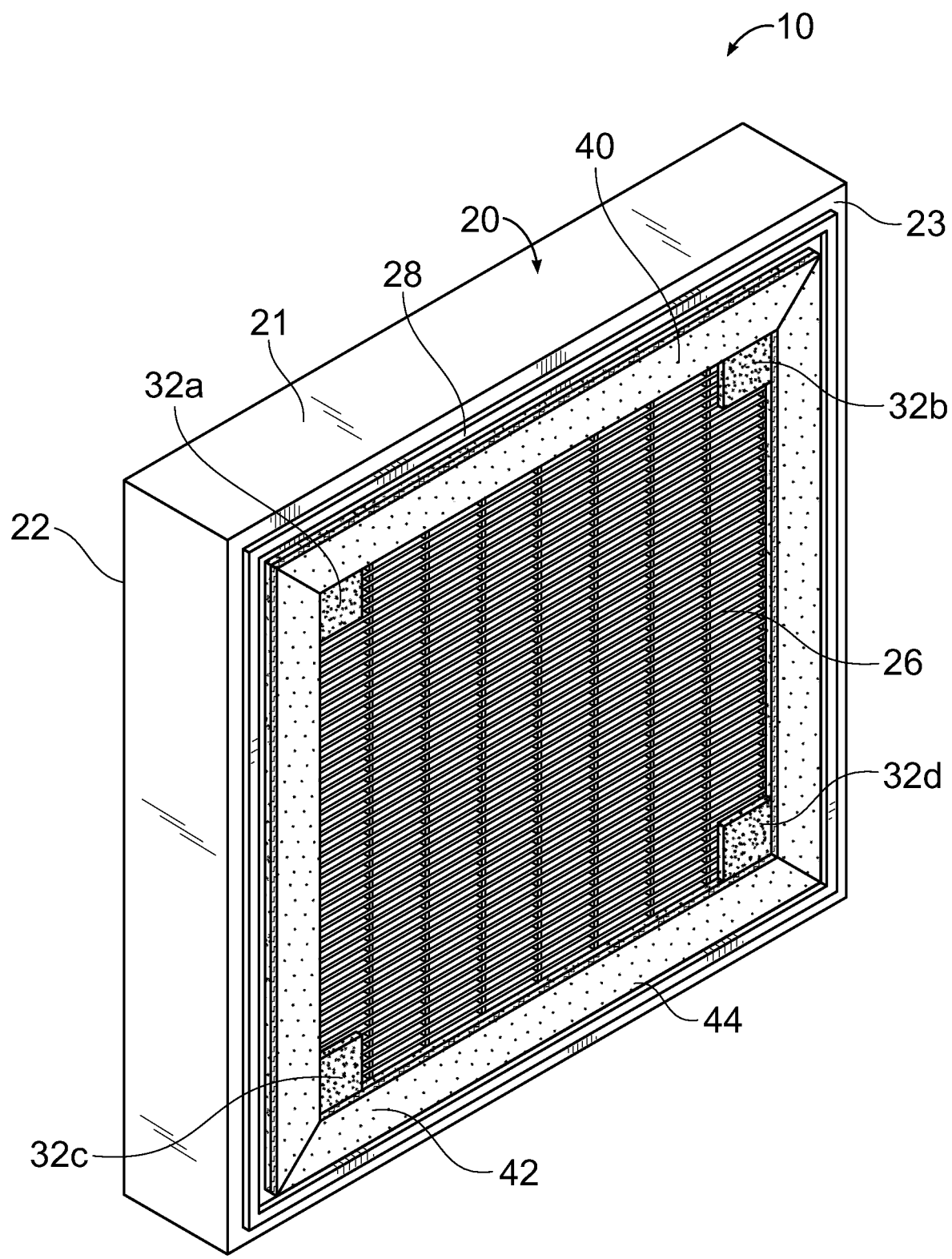
FIG. 8 is a perspective view of a second connector connected to a first connector of a filtration unit of a portable air filtration system in accordance with an example embodiment.

FIG. 8 illustrates the second connector 40 secured to the first connector 30, with the cover 45 of the second connector 40 having been removed and the adhesive 44 exposed. In such a configuration, the filtration unit 20 is ready to be secured to a barrier 12 such as by pressing the filtration unit 20 against the barrier 12 so that the exposed adhesive 44 of the second connector 40 adheres against the barrier 12. It can be seen that each of the retainers 32a, 32b, 32c, 32d for the secondary filter 50 remain exposed so that the secondary filter 50 may be added or removed as needed without affecting the first or second connectors 30, 40. It can also be seen that the gasket 28 surrounds both the first and second connectors 30, 40 to ensure an airtight seal.

Figure 16:
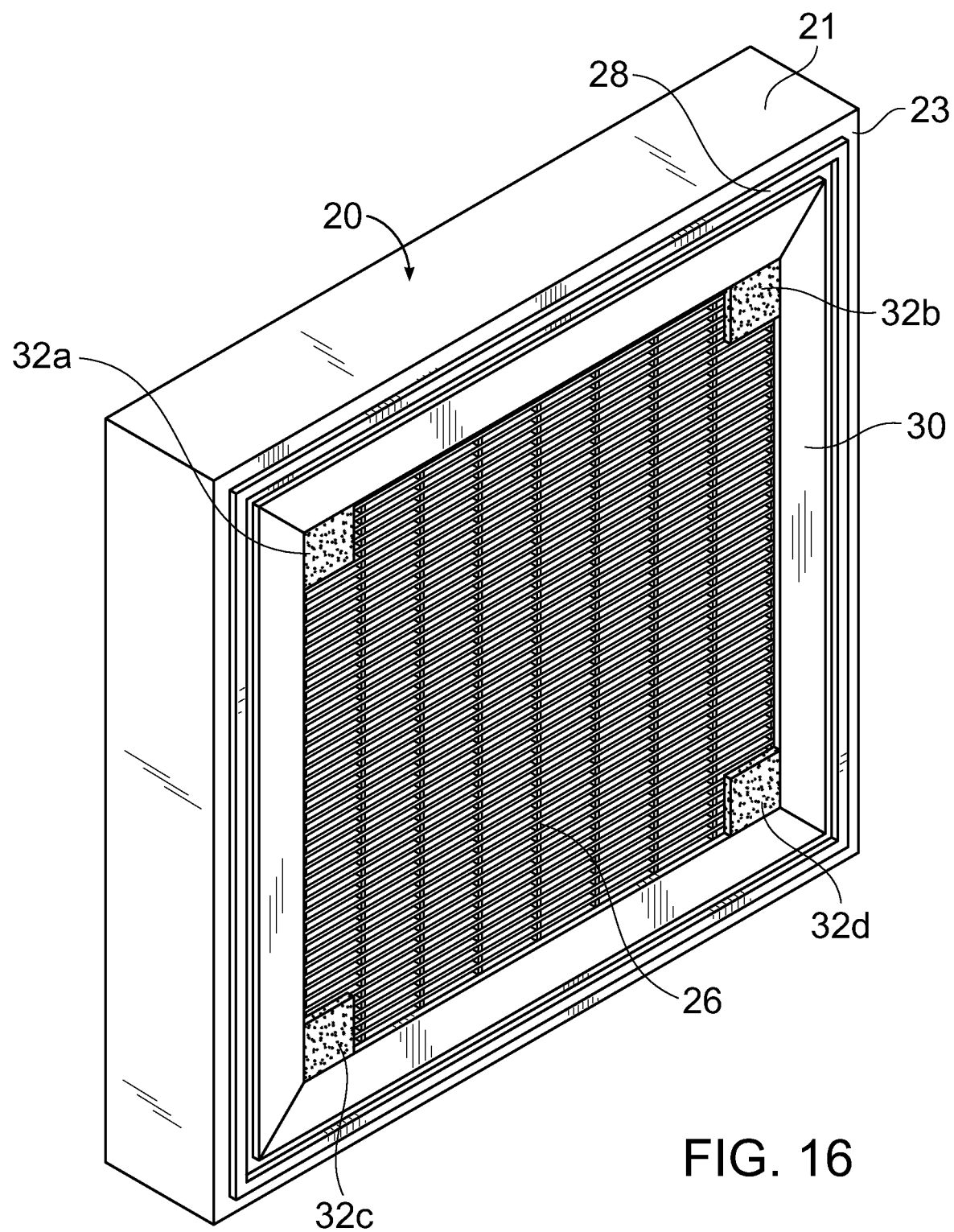
FIG. 16 is a perspective view of a filtration unit including a first connector having a first magnetic element of a portable air filtration system in accordance with an example embodiment.
Figure 17:
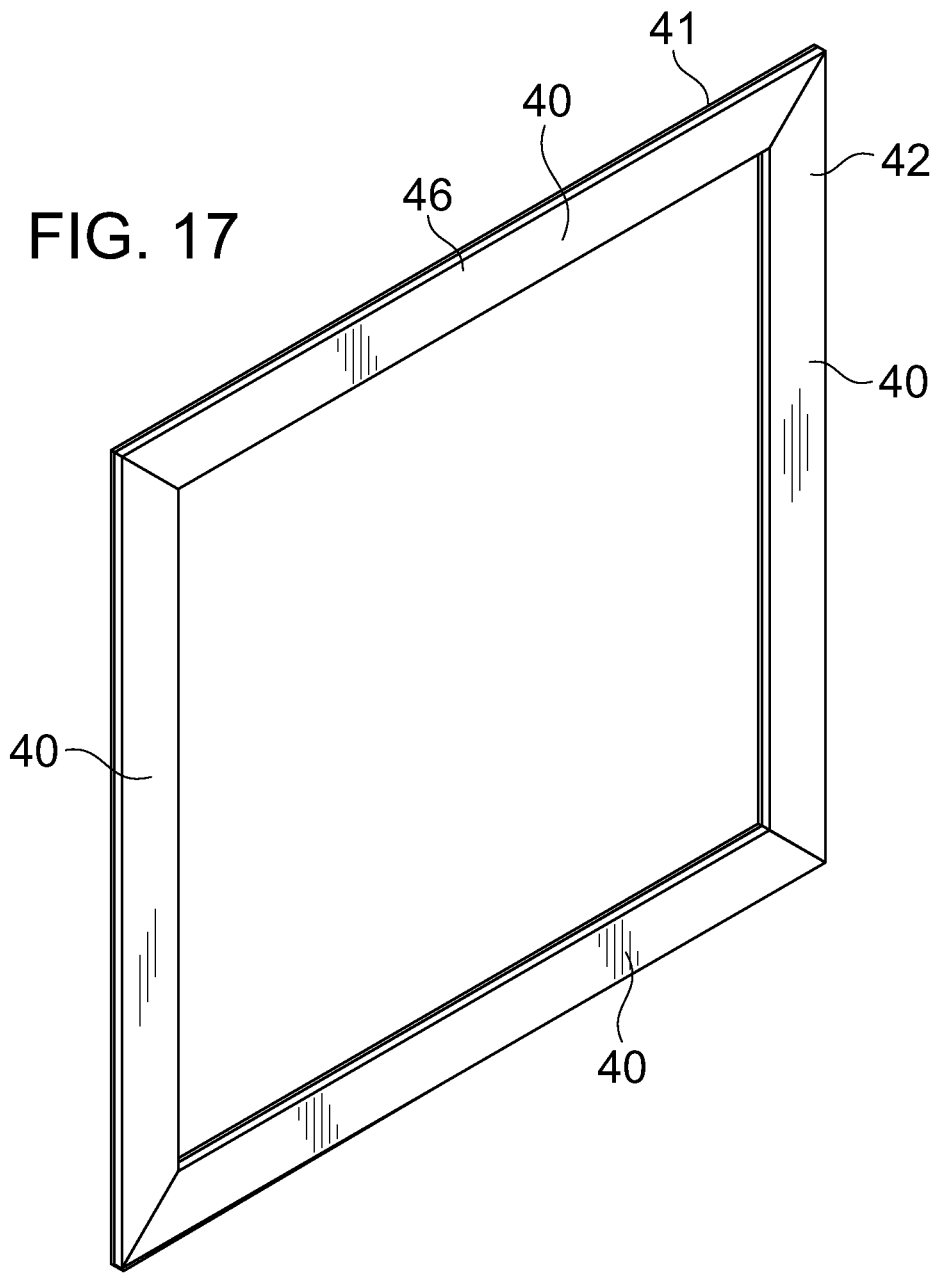
FIG. 17 is a perspective view of a second connector having a second magnetic element of a portable air filtration system in accordance with an example embodiment.
Figure 18:
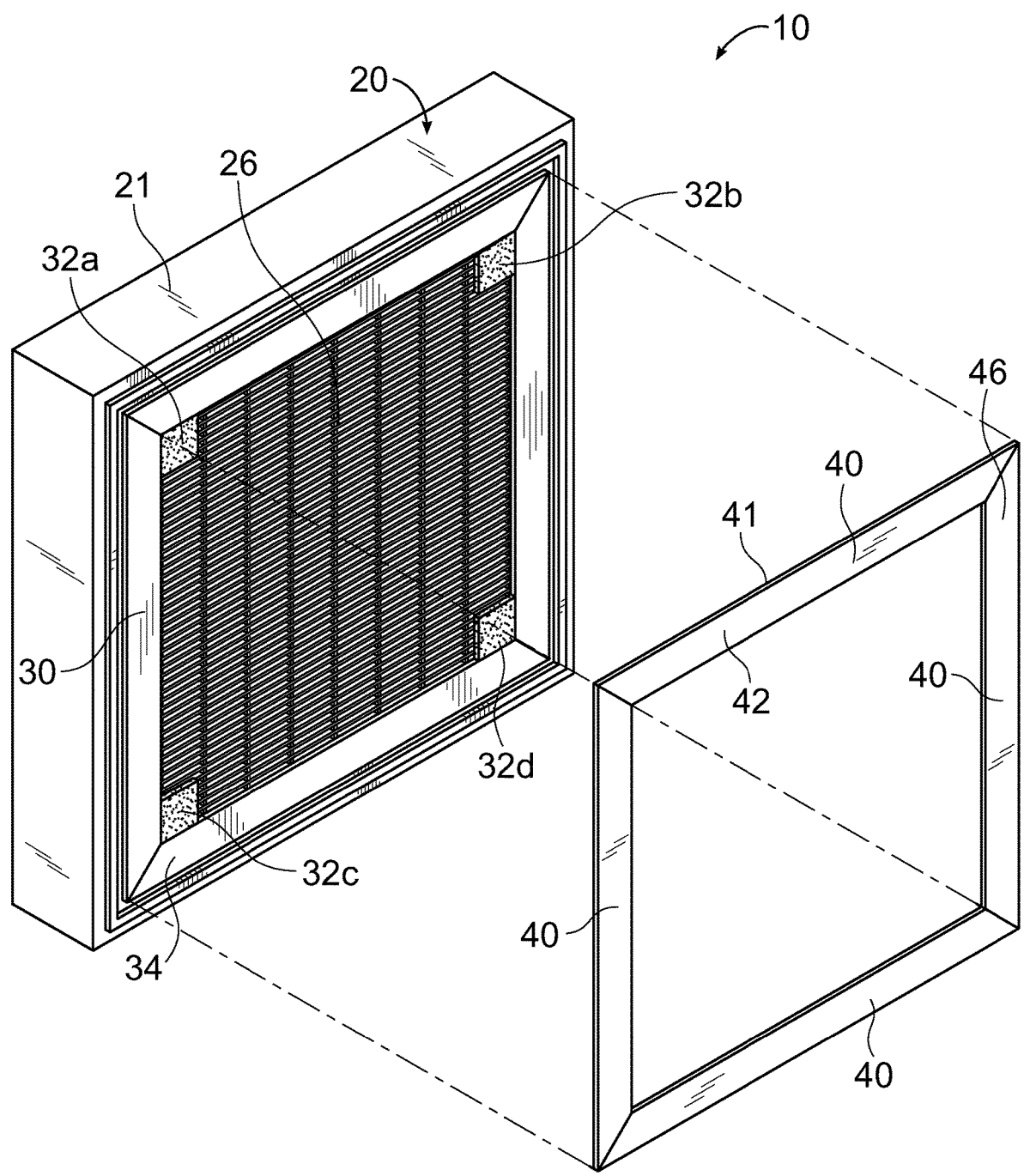
FIG. 18 is a perspective view of a second connector having a second magnetic element being aligned for connection to a first connector having a first magnetic element of a portable air filtration system in accordance with an example embodiment.

FIGS. 16 and 17 illustrate an alternative embodiment in which the second connector 40 comprises a second magnetic element 46 rather than a fastener 43 and adhesive 44. In such an embodiment, the second connector 40 may be comprised of a magnetic material which is configured to be magnetically attractable with respect to corresponding the magnetic material of a corresponding first magnetic element 34 of the first connector 30. In such an embodiment, no adhesive 44 or fastener 43 is needed.

It should be understood that the entire body of the second connector 40 need not be comprised of a magnetic material. Instead, only the first side 41 of the second connector 40, which faces the first connector 30, need be comprised of a magnetic material. The second side 42 could thus be any material, with the second magnetic element 46 being affixed thereto. It should also be appreciated that the magnetic material may not extend for the entire length of the second connector 40. Instead, discrete magnets may be arranged which are not continuous, but still configured to ensure a tight connection. Thus, the single, continuous magnetic element 46 shown in the figures should not be construed as limiting, as multiple, discrete magnetic elements 46 could instead be used in some embodiments.

D. Pre-Filter.

Figure 21:
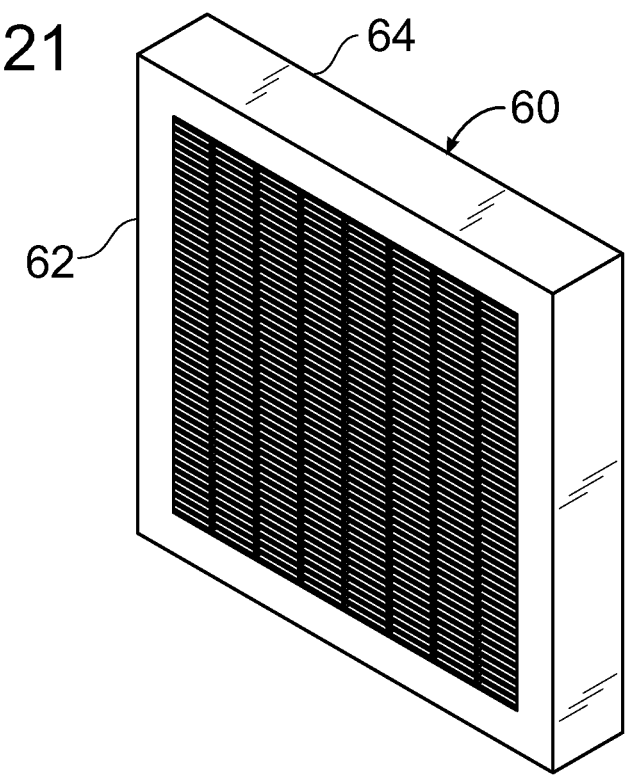
FIG. 21 is a first perspective view of a pre-filter of a portable air filtration system in accordance with an example embodiment.
Figure 22:
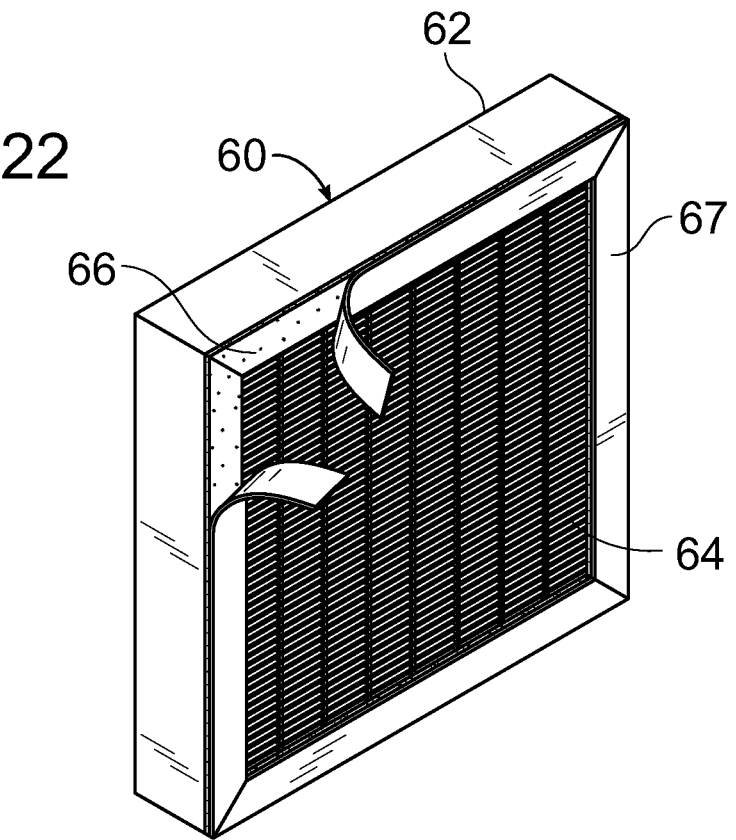
FIG. 22 is a second perspective view of a pre-filter of a portable air filtration system in accordance with an example embodiment.
Figure 23:
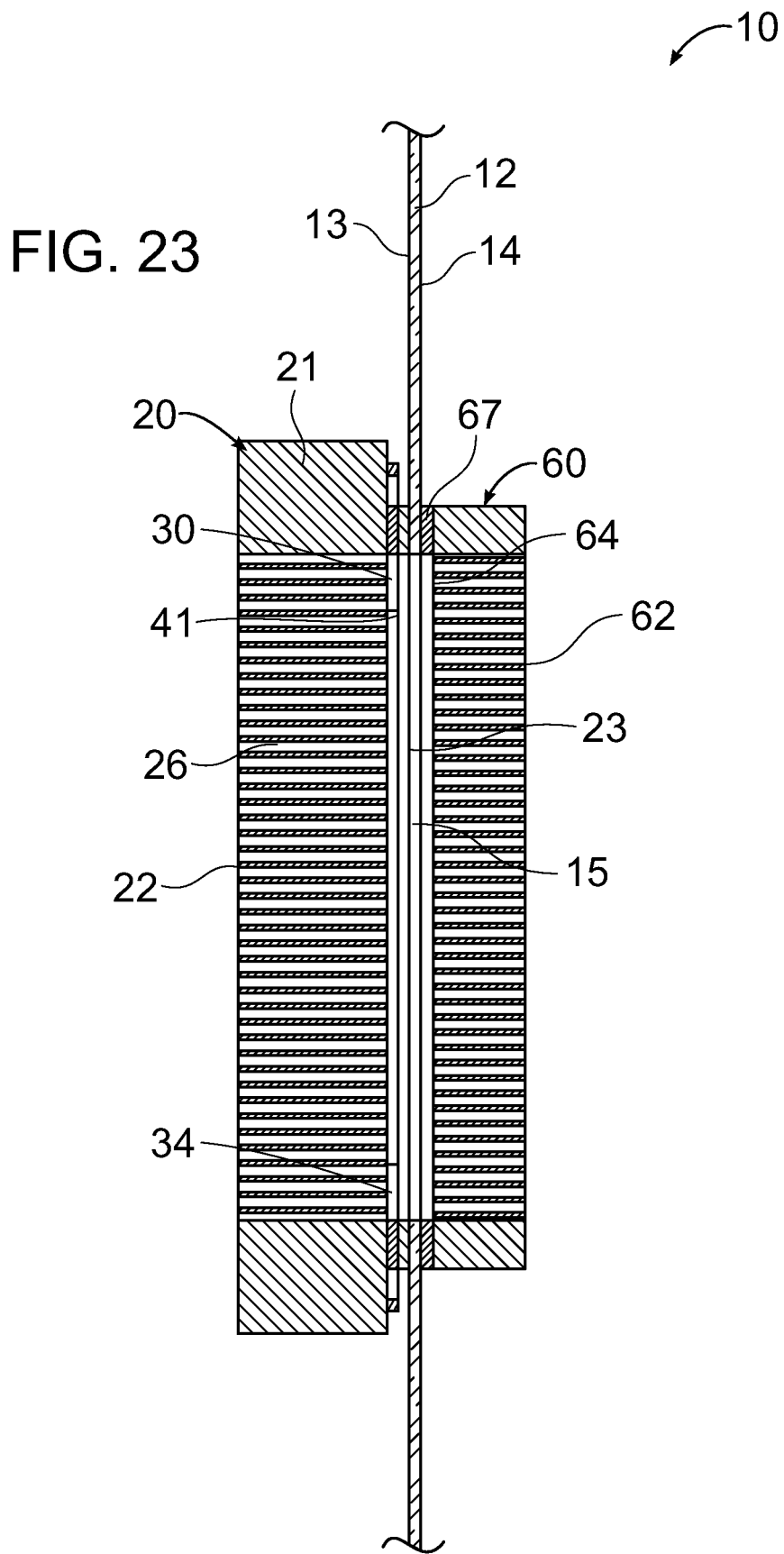
FIG. 23 is a sectional view of a filtration unit and pre-filter connected on opposite sides of a barrier of a portable air filtration system in accordance with an example embodiment.

FIGS. 21-23 illustrate an exemplary embodiment which includes a pre-filter 60 connected to the opposite side of the barrier 12 as the filtration unit 20. In the embodiment shown in the figures, the pre-filter 60 will be connected on the side of the barrier 12 which is contained (i.e., the inner end 14 of the barrier 12). In some embodiments, the pre-filter 60 may be instead connected to the outer end 13 of the barrier 12.

As shown in FIGS. 21 and 22, it can be seen that the pre-filter 60 comprises a separate filtration unit which may be secured to the barrier 12 opposite of the filtration unit 20 so as to provide additional filtration of airflow. The type of pre-filter 60 utilized may vary in different embodiments, but will generally comprise fibers which are interweaved so as to filter particulates from any air passing therethrough.

FIG. 21 illustrates the first end 62 of the pre-filter 60 which faces away from the barrier 12. As illustrated, the pre-filter 60 may include a similar structure as the filtration unit 20. The pre-filter 60 may be the same size as the filtration unit 20, smaller than the filtration unit 20, or larger than the filtration unit 20. Additionally, the pre-filter 60 may comprise the same shape as the filtration unit 20, or may comprise a different shape than the filtration unit 20.

FIG. 22 illustrates the second end 64 of the pre-filter 60 which is secured to the barrier 12 opposite to the filtration unit 20. The manner in which the pre-filter 60 is connected to the barrier 12 may vary in different embodiments. In the exemplary embodiment shown in FIG. 22, it can be seen that the second end 64 of the pre-filter 60 includes an adhesive 66 which is utilized to secure the pre-filter 60 to the barrier 12. The type of adhesive 66 utilized may vary in different embodiments. A cover 67 may temporarily cover the adhesive 66 until such time as the pre-filter 60 is being installed, at which time the cover 67 may be removed, such as be peeling oft to expose the underlying adhesive 66.

FIG. 23 illustrates a pre-filter 60 being connected to the barrier 12 on a side opposite of the filtration unit 20, with the pre-filter 60 being adapted to preliminarily filter airflow prior to entering the filtration unit 20. Thus, the pre-filter 60 will preferably at least partially cover the second opening 25 of the filtration unit 20 so as to filter at least part of the airflow entering the filtration unit 20. Preferably, the pre-filter 60 will cover the entire second opening 25 of the filtration unit 20 so as to filter all of the airflow entering the filtration unit 20.

E. Operation of Preferred Embodiment.

FIGS. 7-12 illustrate an exemplary method of installing the filtration unit 20 on a barrier 12. It should be appreciated that the order of connecting the first and second connectors 30, 40 together and connecting the second connector 40 to the barrier 12 may be performed in various manners. In the exemplary embodiment shown in FIGS. 7 and 8, the second connector 40 is connected first to the first connector 30 of the filtration unit 20, and then the filtration unit 20, including the connected second connector 40, is secured to the barrier 12. In some embodiments, the second connector 40 may instead first be secured to the barrier 12 before the filtration unit 20 is secured to the second connector 40 and the barrier 12.

In use, the second connector 40 may first be cut into shape. Desired lengths may be unrolled from a roll of second connector 40 such as shown in FIG. 5C. The indicia 47 may be utilized to aid with determining length. For example, the indicia 47 may be set apart by a set and known distance so that the operator may cut a desired length by simply counting indicia 47 and cutting at the appropriate location. For example, if the desired length of each strip of second connector 40 is one foot, and the indicia 47 are spaced apart every six inches, an operator would cut the second connector 40 at the second indicia 47 to produce a one foot strip.

In a preferred embodiment as shown in FIG. 6, the second connector 40 may be cut into four strips which are formed into a closed-loop. In the exemplary embodiment shown in FIG. 6, the closed-loop is comprised of a rectangular- or square-shaped frame. In other embodiments, the closed-loop could be comprised of a circular or triangular shape. The ends of the strips of second connector 40 may be adjoined together to form the closed-loop, with the indicia 47 providing a guide to cut diagonal corners which fit together in the manner shown in the figures.

In alternate embodiments, the strips of the second connector 40 may not be formed into shape before connecting to the filtration unit 20, with each strip being separately and independently secured to the first connector 30 of the filtration unit 20. In other embodiments, the second connector 40 may come pre-packaged in the necessary shape such that no cutting is necessary. In some embodiments, indicia 47 may be omitted.

After cutting the second connector 40 into strips (if needed) and arranging the strips of second connector 40 into a desired orientation (if needed), the second connector 40 may be secured either to the barrier 12 or to the filtration unit 20. The order in which the second connector 40 is connected to the barrier 12 and filtration unit 20 may vary depending on the preference of the operator of the portable air filtration system 10.

FIGS. 7 and 8 illustrate an embodiment in which the second connector 40 is first connected to the filtration unit 20. As shown in 7, the second connector 40 is oriented such that the first side 41 of the second connector 40 faces the second end 23 of the filtration unit 20. The second connector 40 is then secured to the filtration unit 20 by engaging with its first connector 30. The fastener 31 of the first connector 30 engages with the fastener 43 on the first side 41 of the second connector 40 to secure the second connector 40 to the filtration unit 20. It should be appreciated that in some embodiments, the second connector 40 may instead be secured to the first end 22 of the filtration unit 20.

If the second connector 40 is comprised of multiple strips, the strips may be independently connected one-by-one to the first connector 30 of the filtration unit 20, or may be pressed down simultaneously. It would be preferable to apply pressure along the entire length of the second connector 40 to ensure that it is tightly connected to the first connector 30 without any gaps between engagements of the respective fasteners 31, 43. After the second connector 40 is secured against the filtration unit 20, the cover 45 may be removed so as to expose the adhesive 44 and allow the filtration unit 20 to be secured against the barrier 12.

Figure 9:
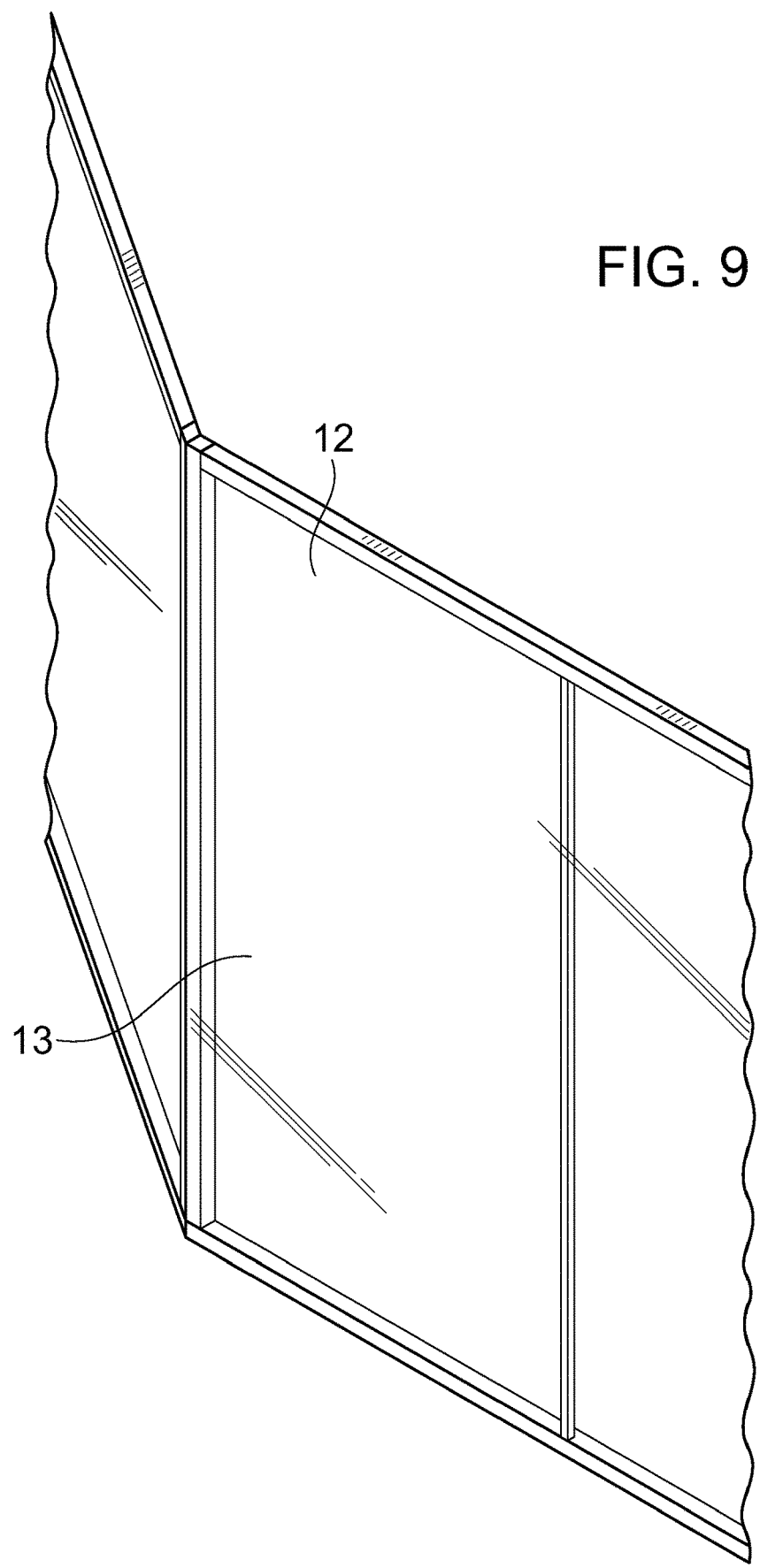
FIG. 9 is a perspective view of a barrier of a portable air filtration system in accordance with an example embodiment.

FIG. 9 illustrates a barrier 12 comprised of sheeting which is secured between a roof and floor of a structure. The manner in which the barrier 12 is formed may vary to suit different spaces and purposes. Further, the type of material 12 used for the barrier 12 will vary in different embodiments. In the embodiment shown in the figures, the barrier 12 is comprised of plastic sheeting which is suspended or otherwise connected to enclose a space. Generally, the construction of the barrier 12 will be completed prior to connecting the filtration unit 20.

Figure 10:
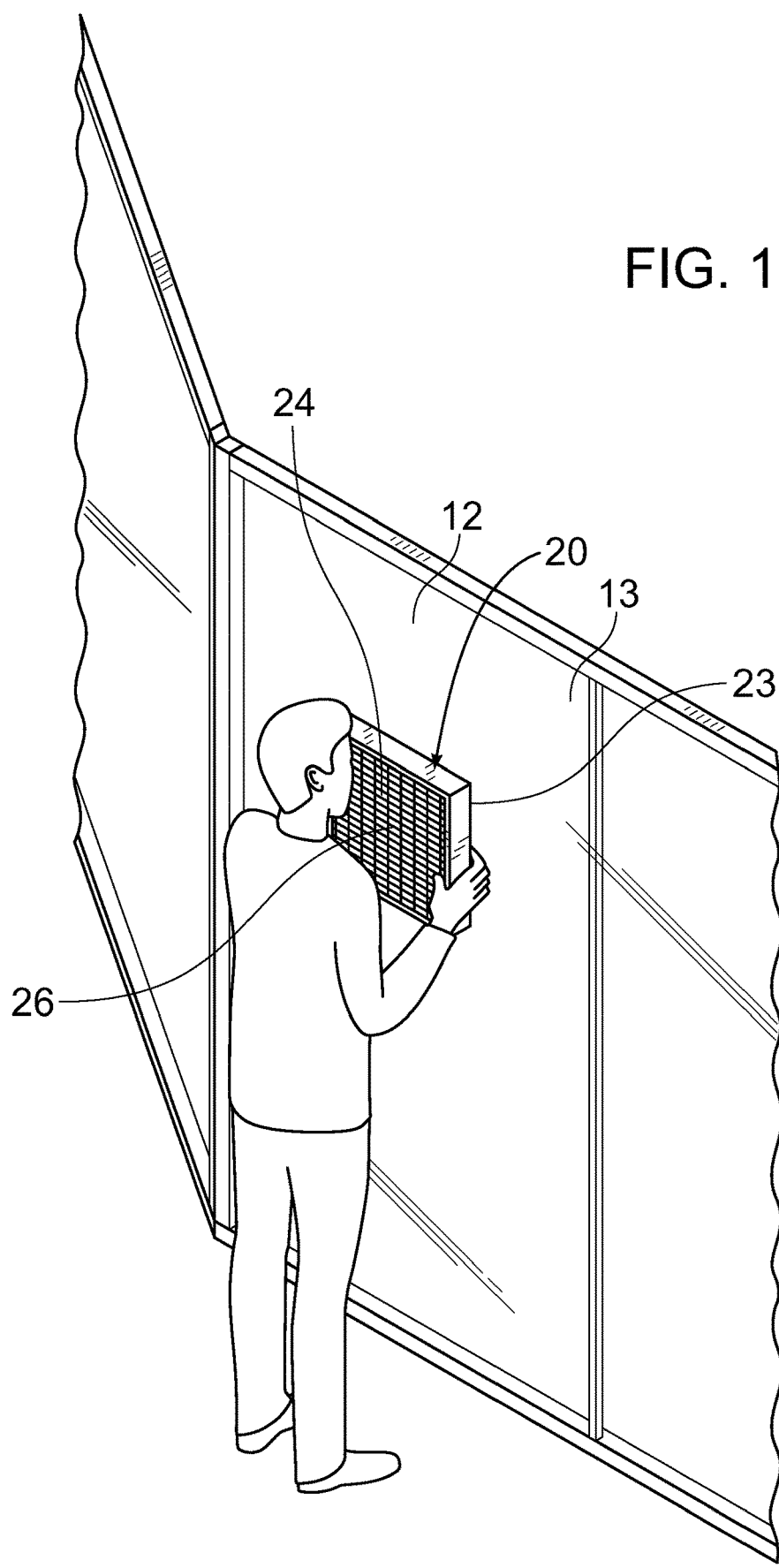
FIG. 10 is a perspective view illustrating installation of a filtration unit on a barrier of a portable air filtration system in accordance with an example embodiment.

The barrier 12 includes an outer end 13 and an inner end 14, with the inner end 14 facing the interior of the space which is cordoned off by the barrier 12. FIG. 10 illustrates the filtration unit 20 being connected to the outer end 13 of the barrier 12. It should be appreciated, however, that the filtration unit 20 may instead be connected to the inner end 14 of the barrier 12 in some embodiments. In such embodiments, the first connector 30 may be on the first end 22, rather than the second end 23, of the filtration unit 20.

As shown in FIG. 10, the filtration unit 20 may be secured against the outer end 13 of the barrier 12. The cover 45 having been removed from the second connector 40, the adhesive 44 is exposed. The adhesive 44 may thus be pressed against the barrier 12 to secure the filtration unit 20 to the barrier 12 such as shown in FIG. 10. In this manner, the filtration unit 20 may be adhered to the barrier 12.

Figure 11:
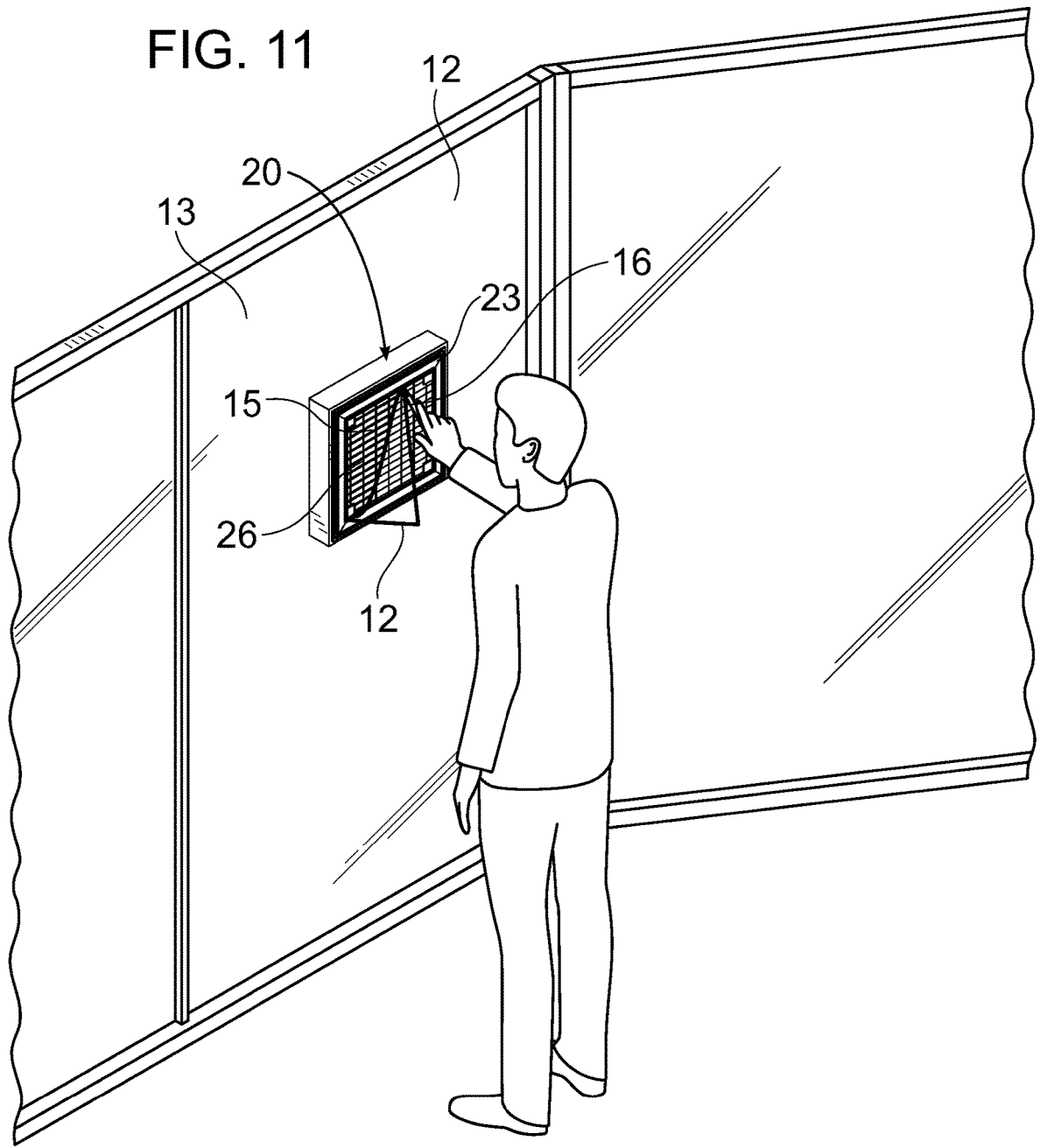
FIG. 11 is a perspective view illustrating cutting of an opening in a barrier of a portable air filtration system in accordance with an example embodiment.

FIG. 11 illustrates an embodiment in which the barrier 12 is not pre-cut to include an opening 15 for the filtration unit 20. It should be appreciated that, in some embodiments, the barrier 12 may already have an opening 15 sized for connection of a filtration unit 20. In other embodiments, the opening 15 in the barrier 12 may be cut prior to or during connection of the filtration unit 20.

In the embodiment shown in FIG. 11, the operator is shown cutting an opening 15 in the sheeting of the barrier 12 behind the filtration unit 20. A cutting tool 16 such as a knife, razor, or the like may be utilized to cut the opening 15. The manner in which the opening 15 is cut may vary widely and should not be construed as limited in any manner. The opening 15 cut in the barrier 12 should be the same size, or smaller than, the size of the second opening 25 of the filtration unit 20. It is important that the opening 15 be inset with respect to the gasket 28 to maintain a seal.

It should be appreciated that the operator 12 may perform the step of cutting an opening 15 in the barrier 18 at various stages during the installation process of the filtration unit 20. The opening 15 in the barrier 18 may be cut prior to connecting the filtration unit 20 and/or the second connector 40. The opening 15 in the barrier 18 may be cut after securing the second connector 40 to the barrier 18, but prior to securing the filtration unit 20 to the second connector 40.

In the embodiment shown in FIG. 11, it is shown that the operator 12 has secured the second connector 40 to the barrier 18 and secured the filtration unit 20 to the second connector 40 prior to cutting the opening 15 in the barrier 12. Such an exemplary illustration should not be construed as limiting, as the opening 15 could be cut at any time prior to, during, or after connecting the filtration unit 20 to the barrier 12. In some embodiments, the barrier 12 may be marked, such as by a writing utensil, prior to cutting the opening 15.

Figure 12:
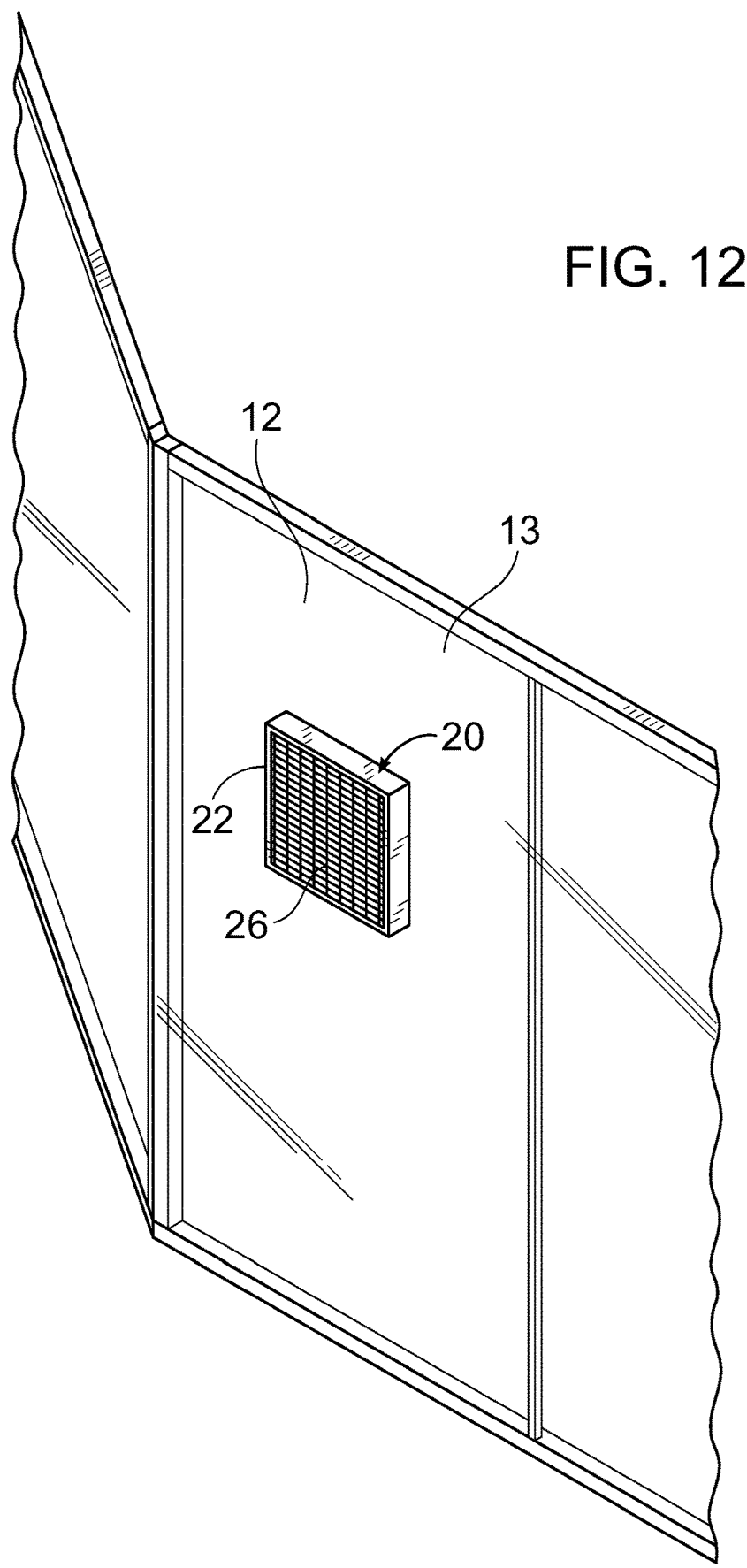
FIG. 12 is a perspective view of a filtration unit connected to a barrier of a portable air filtration system in accordance with an example embodiment.

The operator 12 may cut a continuous opening 15 such as shown in FIG. 12. In such an embodiment, the opening 15 is illustrated as comprising a rectangular shape which matches the shape of the exemplary filtration unit 20 illustrated. In other embodiments, the shape of the opening 15 may vary. For example and without limitation, the shape of the opening 15 could be triangular or circular.

Figure 20:
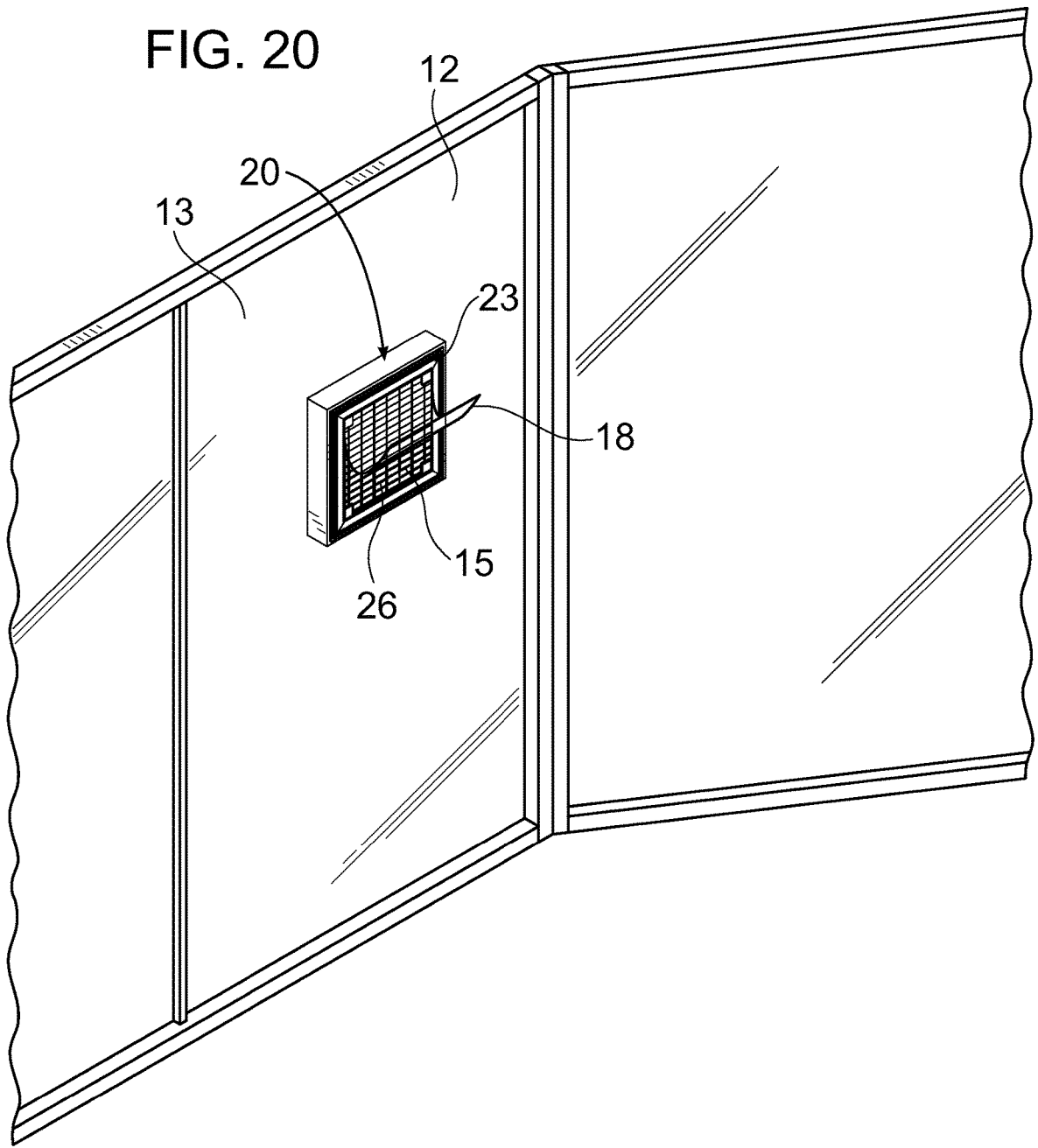
FIG. 20 is a perspective view of a filtration unit connected to a barrier including a barrier flap of a portable air filtration system in accordance with an example embodiment.

In some embodiments, the opening 15 may only be partially cut so as to form a flap 18 of the sheeting of the barrier 12 that may function as a one-way valve. Such an embodiment is shown in FIG. 20, in which it can be seen that the opening 15 has only been cut along three sides such that the upper edge remains attached to form the flap 18. The embodiment of the flap 18 shown in FIG. 20 is pivotable upwardly and downwardly, with the upper edge remaining connected. It should be appreciated that in alternate embodiments, other edges may remain connected. For example, either of the side edges of the opening 15 may remain connected such that the flap 18 is pivotable from side-to-side, rather than up-and-down.

After cutting the opening in the barrier 12 (if needed), the filtration unit 20 is ready for use such as shown in FIG. 12. If the primary filter 26 needs to be changed, the filtration unit 20 may be pulled off the barrier 12. The second connector 40 will remain in place around the opening of the barrier 12, awaiting either the original filtration unit 20 being reconnected after replacement of the primary filter 26, or a new filtration unit 20 to be connected.

As described previously, a flap 48 may be optionally connected to the filtration unit 20 by using the first connector 30 of the filtration unit 20. The flap 48 will selectively cover the opening in the barrier 12 to function as a one-way valve. Additionally, a secondary filter 50 may be connected to the filtration unit 20 using the retainers 32a, 32b, 32c, 32d. The flap 48 and/or secondary filter 50 may be installed on the filtration unit 20 either before or after the filtration unit 20 has been secured to the barrier 12. Further, the flap 48 and/or secondary filter 50 may be removed or replaced while the filtration unit 20 remains installed on the barrier 12.

While the preceding description and referenced figures illustrate that the second connector 40 is installed on the filtration unit 20 prior to connecting the filtration unit 20 to the barrier 12, it should be appreciated that the order may be altered in different embodiments. For example, the second connector 40 could first be connected to the barrier 12. In such an embodiment, the cover 45 is removed from the second connector 40, and then the exposed adhesive 44 on the second side 42 of the second connector 40 is secured against the plastic sheeting of the barrier 12. The filtration unit 20 is then pressed against the second connector 40 such that the first connector 30 of the filtration unit 20 engages with the second connector 40 on the barrier 12.

FIG. 23 illustrates connection of a pre-filter 60 on the opposite side of the barrier 12 with respect to the filtration unit 20. The pre-filter 60 may be connected to the barrier 12 by first removing the cover 67 over the adhesive 66 (if included) so as to expose the adhesive 60, and then pressing the adhesive 66 of the pre-filter 60 against the barrier 12. The pre-filter 60 may be connected to the barrier 12 prior to, concurrently with, or after connection of the filtration unit 20. It should be appreciated that the pre-filter 60 may be used in combination with both the primary filter 26 and the secondary filter 50 to provide triple filtration of airflow. The use of three stages of filtration may be preferable in particularly dusty environments or areas.

Figure 19:
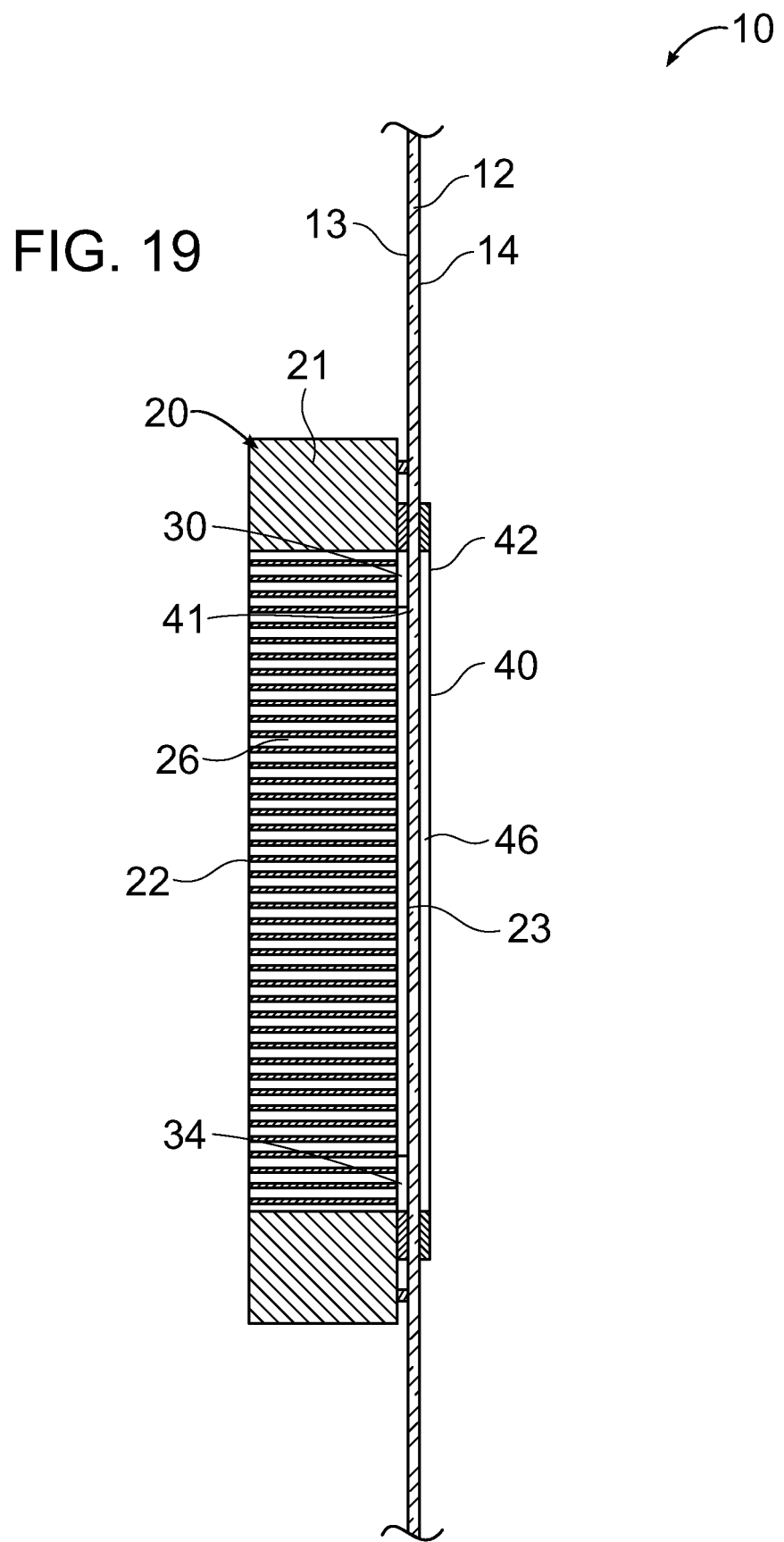
FIG. 19 is a sectional view of a filtration unit connected to a barrier by a first connector having a first magnetic element and a second connector having a second magnetic element of a portable air filtration system in accordance with an example embodiment.

FIGS. 16-19 illustrate an embodiment of the portable air filtration system 10 which utilizes magnetic elements 34, 46 rather than fasteners 31, 43 and adhesive 44. Such an embodiment is connected to the barrier 12 in a slightly different manner than the embodiment which was previously described herein. As shown in FIG. 19, the barrier 12 is sandwiched between the first connector 30 and the second connector 40 in such a magnetic embodiment.

With reference to FIG. 19, it can be seen that the filtration unit 20, including the first connector 30, is positioned on a first side of the barrier 12. The second connector 40 is positioned on a second side of the barrier 12. The first magnetic element 34 of the first connector 30 is magnetically engaged with the second magnetic element 46 of the second connector 40 to secure the filtration unit 20 against the barrier 12.

To install such an embodiment, the second connector 40 is first put in position on a second side of the barrier 12. The filtration unit 20 is then placed in position on the first side of the barrier 12, with the first magnetic element 34 of the first connector 30 being aligned with the second magnetic element 46 of the second connector 40. In some embodiments, the second connector 40 may include some adhesive such that the magnetic element 46 is secured against the second side of the barrier 12 without being separately held prior to connecting the filtration unit 20.

The respective magnetic elements 34, 46 are then pressed together so as to magnetically engage, which secures the filtration unit 20 against the barrier 12, with the second connector 40 being held in place by magnetic attraction on the opposite side of the barrier 12 with respect to the filtration unit 20. In such an embodiment, an opening in the barrier 12 may be cut if needed using the same steps as previously described. The flap 48 and/or secondary filter 50 may similarly be connected, disconnected, or replaced in the same manner as previously described. Replacement of the filtration unit 20 simply requires the filtration unit 20 to be pulled away from the barrier 12 such that the magnetic elements 34, 46 disengage, after which the same or a different filtration unit 20 may be reconnected using the same steps previously described.

Unless otherwise defined, all technical and scientific terms used herein have the same meaning as commonly understood by one of ordinary skill in the art to which this invention belongs. Although methods and materials similar to or equivalent to those described herein can be used in the practice or testing of the portable air filtration system, suitable methods and materials are described above. All publications, patent applications, patents, and other references mentioned herein are incorporated by reference in their entirety to the extent allowed by applicable law and regulations. The portable air filtration system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A portable air filtration system, comprising:
a filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter;
a secondary filter removably connected to the first connector of the filtration unit; and
a second connector adapted to secure the filtration unit against a barrier, the second connector comprising a first side and a second side, wherein the first side of the second connector is removably connected to the first connector, wherein the second side of the second connector is adapted to be connected to the barrier; and,
wherein the first connector is comprised of a fastener, wherein the first side of the second connector is comprised of a fastener, wherein the fastener of the first connector and the fastener of the second connector are each comprised of a hook-and-loop fastener.

2. The portable air filtration system of claim 1, wherein the first connector is connected to the second end of the housing.

3. The portable air filtration system of claim 2, wherein the first connector is connected to the housing so as to surround the second opening of the housing.

4. The portable air filtration system of claim 1, wherein the second side of the second connector is comprised of an adhesive.

5. The portable air filtration system of claim 1, wherein the filtration unit comprises a gasket positioned so as to surround the second opening of the housing.

6. The portable air filtration system of claim 1, wherein the filtration unit comprises a one-way valve.

7. The portable air filtration system of claim 6, wherein the filtration unit comprises one or more retainers, wherein the one-way valve is removably connected to the one or more retainers.

8. The portable air filtration system of claim 6, wherein the one-way valve is comprised of a flap.

9. A portable air filtration system, comprising:
a barrier adapted to enclose a space, wherein the barrier comprises an opening;
a filtration unit adapted to be connected to the barrier so as to cover the opening of the barrier, the filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter;

a secondary filter removably connected to the first connector of the filtration unit; and a second connector for connecting the filtration unit to the barrier, the second connector comprising a first side and a second side, wherein the second side of the second connector is connected to the barrier, wherein the first side of the second connector is removably connected to the first connector;

wherein the first connector comprises a first magnetic element and wherein the second connector comprises a second magnetic element, wherein the first magnetic element is adapted to magnetically engage with the second magnetic element.

10. The portable air filtration system of claim 9, wherein the first connector comprises a fastener.

11. The portable air filtration system of claim 10, wherein the second side of the second connector is comprised of an adhesive and wherein the first side of the second connector is comprised of a fastener.

12. The portable air filtration system of claim 9, wherein the first connector comprises a first magnetic element and wherein the second connector comprises a second magnetic element, wherein the first magnetic element is adapted to magnetically engage with the second magnetic element.

13. A portable air filtration system, comprising:

a filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter;

a secondary filter removably connected to the first connector of the filtration unit; and a second connector adapted to secure the filtration unit against a barrier, the second connector comprising a first side and a second side, wherein the first side of the second connector is removably connected to the first connector, wherein the second side of the second connector is adapted to be connected to the barrier; and, wherein the second side of the second connector is comprised of an adhesive.

14. The portable air filtration system of claim 13, wherein the first side of the second connector is comprised of a fastener.

15. A portable air filtration system, comprising:

a filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter, wherein the first connector is comprised of a first magnetic element;

a secondary filter removably connected to the first connector of the filtration unit; and a second connector adapted to secure the filtration unit against a barrier, the second connector comprising a first side and a second side, wherein the first side of the second connector is removably connected to the first connector, wherein the second side of the second connector is adapted to be connected to the barrier.

16. The portable air filtration system of claim 15, wherein the first side of the second connector is comprised of a second magnetic element, wherein the first magnetic element is adapted to magnetically engage with the second magnetic element.

17. A portable air filtration system, comprising:

a filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter, wherein the filtration unit comprises a gasket positioned so as to surround the second opening of the housing;

a secondary filter removably connected to the first connector of the filtration unit; and a second connector adapted to secure the filtration unit against a barrier, the second connector comprising a first side and a second side, wherein the first side of the second connector is removably connected to the first connector, wherein the second side of the second connector is adapted to be connected to the barrier.

18. A portable air filtration system, comprising:

a filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter, wherein the filtration unit comprises a one-way valve;

a secondary filter removably connected to the first connector of the filtration unit; and a second connector adapted to secure the filtration unit against a barrier, the second connector comprising a first side and a second side, wherein the first side of the second connector is removably connected to the first connector, wherein the second side of the second connector is adapted to be connected to the barrier.

19. A portable air filtration system, comprising:

a barrier adapted to enclose a space, wherein the barrier comprises an opening;

a filtration unit adapted to be connected to the barrier so as to cover the opening of the barrier, the filtration unit comprising a housing, a primary filter, and a first connector, wherein the housing comprises a first end, a first opening at the first end, a second end, and a second opening at the second end, wherein the primary filter is connected to the housing such that an airflow entering the housing passes through the primary filter;

a secondary filter removably connected to the first connector of the filtration unit; and a second connector for connecting the filtration unit to the barrier, the second connector comprising a first side and a second side, wherein the second side of the second connector is connected to the barrier, wherein the first side of the second connector is removably connected to the first connector;

wherein the first connector comprises a fastener;

wherein the second side of the second connector is comprised of an adhesive and wherein the first side of the second connector is comprised of a fastener.

* * * * *